(12) United States Patent
Abe et al.

(10) Patent No.: US 12,228,813 B2
(45) Date of Patent: Feb. 18, 2025

(54) OPTICAL SENSOR-EQUIPPED LIQUID CRYSTAL DISPLAY DEVICE

(71) Applicant: Japan Display Inc., Tokyo (JP)

(72) Inventors: Hiroyuki Abe, Tokyo (JP); Akihiko Saitoh, Tokyo (JP); Teppei Yamada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/507,638

(22) Filed: Nov. 13, 2023

(65) Prior Publication Data

US 2024/0160059 A1 May 16, 2024

(30) Foreign Application Priority Data

Nov. 14, 2022 (JP) .................................. 2022-181963

(51) Int. Cl.
| | |
|---|---|
| *G02F 1/1333* | (2006.01) |
| *G02F 1/133* | (2006.01) |
| *G06V 40/13* | (2022.01) |
| *G09G 3/36* | (2006.01) |

(52) U.S. Cl.
CPC ...... *G02F 1/13338* (2013.01); *G02F 1/13306* (2013.01); *G06V 40/1318* (2022.01); *G09G 3/3677* (2013.01); *G09G 2310/0286* (2013.01); *G09G 2310/08* (2013.01); *G09G 2354/00* (2013.01)

(58) Field of Classification Search
CPC .............. G02F 1/1338; G02F 1/13306; G06V 40/1318; G09G 3/3677; G09G 2310/0286; G09G 2310/08; G09G 2354/00
See application file for complete search history.

(56) References Cited

U.S. PATENT DOCUMENTS

| | | | |
|---|---|---|---|
| 2015/0161954 A1* | 6/2015 | Tokita | G06F 3/04166 345/174 |
| 2020/0135132 A1* | 4/2020 | Tanaka | G09G 3/3677 |
| 2020/0265207 A1* | 8/2020 | Chu | G02F 1/133512 |

\* cited by examiner

*Primary Examiner* — Kenneth B Lee, Jr.
(74) *Attorney, Agent, or Firm* — Maier & Maier, PLLC

(57) ABSTRACT

According to one embodiment, an optical sensor-equipped liquid crystal display device includes a display panel and a driver IC. The display panel includes a display area including pixels, a surrounding area surrounding the display area, peripheral circuits provided in the surrounding area, and an optical sensor outputting a detection signal in response to incident light. The peripheral circuit includes a shift register, and a gate switch group connected to the shift register and including a first gate switch and a second gate switch. The first gate switch is connected to a switching element for driving the pixel via a scanning line. The second gate switch is connected to a switching element included in a sensor circuit for driving the optical sensor via a scanning line for sensor.

3 Claims, 14 Drawing Sheets

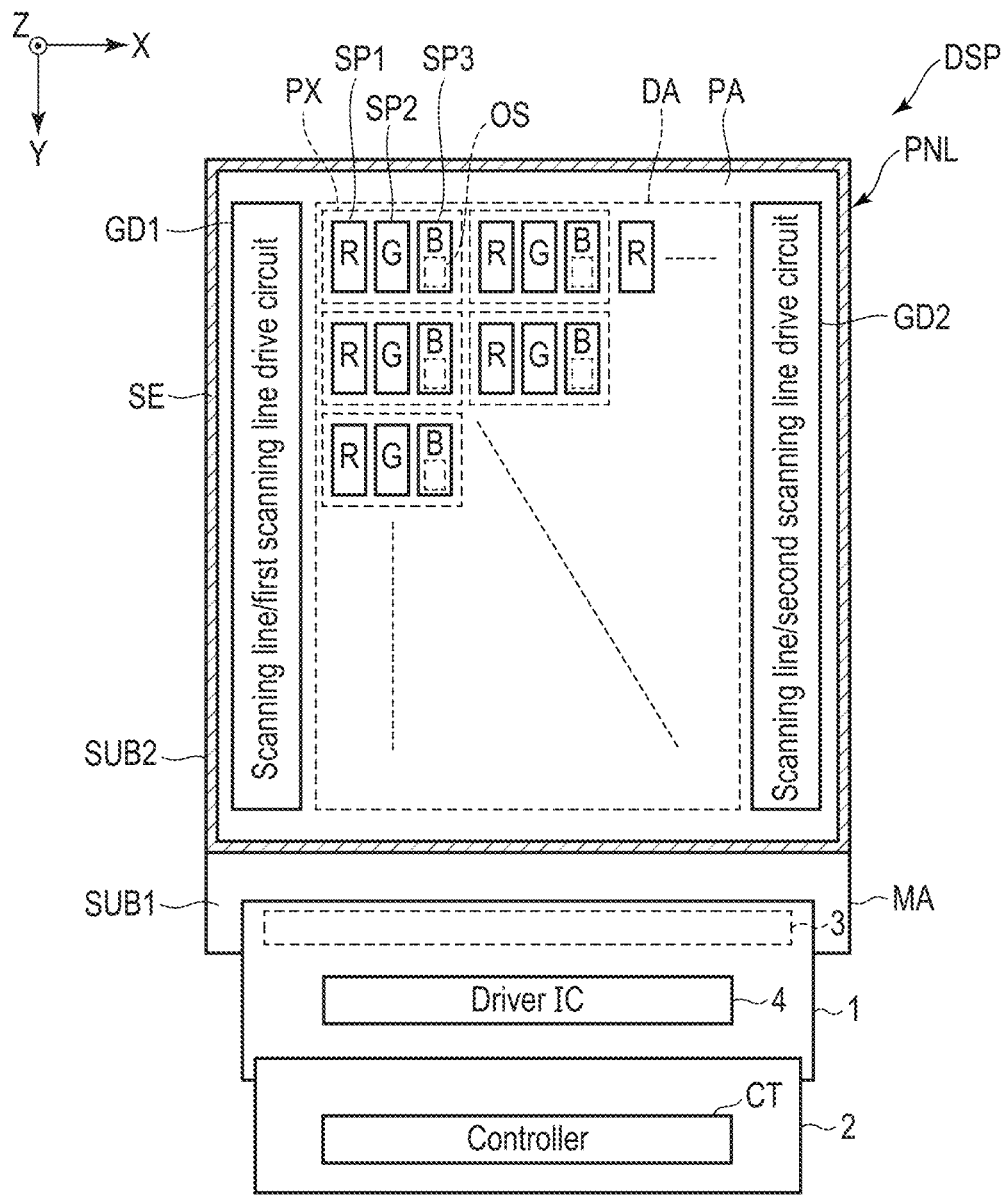
F I G. 2

OPTICAL SENSOR-EQUIPPED LIQUID CRYSTAL DISPLAY DEVICE

CROSS-REFERENCE TO RELATED APPLICATIONS

This application is based upon and claims the benefit of priority from Japanese Patent Application No. 2022-181963, filed Nov. 14, 2022, the entire contents of which are incorporated herein by reference.

FIELD

Embodiments described herein relate generally to an optical sensor-equipped liquid crystal display device.

BACKGROUND

In recent years, liquid crystal display devices (biometric authentication devices) with built-in sensors for detecting biometric information, such as fingerprint sensors and vein sensors, have been developed. For example, an optical sensor using a photoelectric conversion element is used as this type of sensor. For example, the optical sensor detects light emitted from a light source such as a backlight and reflected on an object, and thereby detects biometric information of the object.

As a general liquid crystal display device is required to have a narrower frame, such a liquid crystal display device equipped with an optical sensor is required to have a narrower frame.

BRIEF DESCRIPTION OF THE DRAWINGS

FIG. 2 is a view schematically showing the display device according to the embodiment.

DETAILED DESCRIPTION

Figure 1:
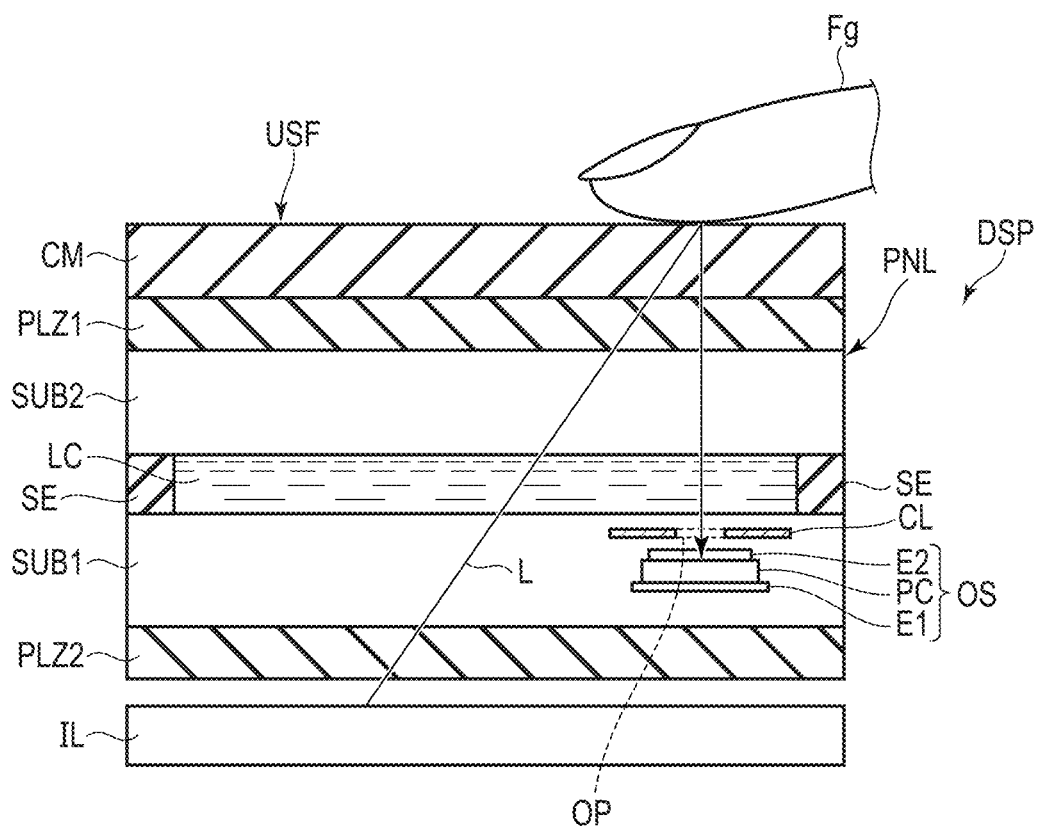
FIG. 1 is a view schematically showing a display device according to an embodiment.

In general, according to one embodiment, an optical sensor-equipped liquid crystal display device includes a display panel including a first substrate, a second substrate opposed to the first substrate, and a liquid crystal layer located between the first substrate and the second substrate, and a driver IC. The display panel includes a display area including a plurality of pixels arrayed in a matrix, a surrounding area surrounding the display area, peripheral circuits connected to the driver IC and provided in areas located on left and right sides of the display area, of the surrounding area, and an optical sensor provided in at least one of the plurality of pixels and including a photoelectric conversion element that outputs a detection signal in response to light made incident from the liquid crystal layer side. The peripheral circuit includes a shift register, and a gate switch group connected to the shift register and including a first gate switch and a second gate switch. The first gate switch is connected to a switching element for driving the pixel via a scanning line. The second gate switch is connected to a switching element included in a sensor circuit for driving the optical sensor via a scanning line for sensor.

Embodiments will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the drawings are schematically illustrated as compared to the actual modes, but the schematic illustration is merely an example and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the drawings, an X-axis, a Y-axis and a Z-axis orthogonal to each other are described to facilitate understanding as needed. A direction along an X-axis is referred to as an X-direction or a first direction, a direction along a Y-axis is referred to as a Y-direction or a second direction, and a direction along a Z-axis is referred to as a Z-direction, a third direction, or a thickness direction. A plane defined by the X-axis and the Y-axis is referred to as an X-Y plane, and a plane defined by the X-axis and Z-axis is referred to as an X-Z plane. Viewing the X-Y plane is referred to as plan view.

FIG. 1 is a view schematically showing a display device DSP according to an embodiment. The display device DSP is a liquid crystal display device equipped with an optical sensor and may be referred to as a biometric authentication device, which will be described later in detail. The display device DSP comprises a display panel PNL, a cover member CM, a first polarizer PLZ1, a second polarizer PLZ2, and an illumination device IL.

The display panel PNL is a liquid crystal display panel, and comprises a first substrate SUB1, a second substrate SUB2 opposed to the first substrate SUB1, a sealing material SE, and a liquid crystal layer LC. The liquid crystal layer LC is sealed between the first substrate SUB1 and the second substrate SUB2 by the sealing material SE. The display panel PNL of the embodiment is a transmissive display panel which displays images by selectively transmitting light from a back surface side of the first substrate SUB1 to an upper surface side of the second substrate SUB2.

The first substrate SUB1 comprises an optical sensor OS and a collimating layer CL. The optical sensor OS is located between a main surface of the first substrate SUB1, which is opposed to the second polarizer PLZ2, and the collimating layer CL. The optical sensor OS comprises a photoelectric conversion element PC, a first electrode E1 arranged on a lower surface of the photoelectric conversion element PC and formed of a metal material, and a second electrode E2 arranged on an upper surface of the photoelectric conversion element PC and formed of a transparent conductive material. The photoelectric conversion element PC is, for example, a photodiode and outputs detection signals corresponding to the incident light. A positive intrinsic negative (PIN) photodiode can be used as the photoelectric conversion element PC. Incidentally, the optical sensor OS may use an organic photo diode (OPD) instead of the PIN photodiode.

The collimating layer CL includes an aperture OP which overlaps with the optical sensor OS. The collimating layer CL is formed of, for example, a metal material and has light-shielding properties. Such a collimating layer CL may be arranged in not only the first substrate SUB1, but the second substrate SUB2.

The sealing material SE adheres the first substrate SUB1 and the second substrate SUB2. A predetermined cell gap is formed between the first substrate SUB1 and the second substrate SUB2 by a spacer (not shown). The liquid crystal layer LC is buried in this cell gap.

The cover member CM is provided on the display panel PNL. For example, a glass substrate or a resin substrate can be used as the cover member CM. The cover member CM has an upper surface USF which an object to be detected by the optical sensor OS contacts. Incidentally, in the embodiment, it is assumed that the upper surface USF of the cover member CM is parallel to the upper surface of the optical sensor OS. In the example of FIG. 1, a finger Fg which is an example of the object is in contact with the upper surface USF. The first polarizer PLZ1 is provided between the display panel PNL and the cover member CM.

The illumination device IL is provided under the display panel PNL and emits light L to the first substrate SUB1. The illumination device IL is, for example, a side-edge type backlight and comprises a plate-shaped light guide and a plurality of light sources that emit light to a side surface of the light guide. The second polarizer PLZ2 is provided between the display panel PNL and the illumination device IL.

Reflective light that is reflected by the finger Fg, of the light L, is made incident on the optical sensor OS through the aperture OP formed in the collimating layer CL. In other words, the reflective light that is reflected by the finger Fg is transmitted through the cover member CM, the first polarizer PLZ1, the second substrate SUB2, the liquid crystal layer LC, and a portion of the first substrate SUB1, which is located on an upper side than the optical sensor OS, until the light is made incident on the optical sensor OS.

As described below, the display panel PNL comprises a plurality of optical sensors OS, and can detect unevenness on the surface of the finger Fg, i.e., a fingerprint, based on the detection signals output from the optical sensors OS.

The optical sensors OS desirably receive the incident light parallel to the normal of the upper surface USF in order to obtain a more accurate detection signal. The collimating layer CL functions as a collimator which parallelizes the light made incident on the optical sensors OS. In other words, the light inclined to the normal of the upper surface USF (in other words, the light inclined to the normal of the upper surfaces of the optical sensors OS) is blocked by the collimating layer CL.

As described above, a function of a fingerprint sensor can be added to the display device DSP by mounting the optical sensors OS on the display device DSP. In addition, the optical sensors OS can also be used to detect information related to a living body in addition to or instead of detection of the fingerprint. The information on the living body is, for example, images of blood vessels such as veins, pulse, pulse waves, and the like, and is detected based on the light reflected inside the finger Fg.

FIG. 2 is a plan view schematically showing the display device DSP according to the embodiment. The display device DSP comprises the above-described display panel PNL, a first flexible printed circuit 1, and a second flexible printed circuit 2. The display panel PNL includes a display area DA on which images are displayed and a surrounding area PA located around the display area DA.

The first substrate SUB1 includes a mounting area MA that does not overlap with the second substrate SUB2. A terminal portion 3 for mounting the first flexible printed circuit 1 is provided in the mounting area MA. The sealing material SE is located in the surrounding area PA. In FIG. 2, the area in which the sealing material SE is arranged is represented by hatch lines. The display area DA is located inside the sealing material SE. The display panel PNL comprises a plurality of pixels PX arrayed in a matrix in the first direction X and the second direction Y, in the display area DA.

Each of the pixels PX includes a sub-pixel SP1 that emits red (R) light, a sub-pixel SP2 that emits green (G) light, and a sub-pixel SP3 that emits blue (B) light. Incidentally, the pixel PX may also include a sub-pixel which emits light of a color other than red, green, and blue colors.

In the example of FIG. 2, one optical sensor OS is arranged for each pixel PX. More specifically, one optical sensor OS is arranged for the sub-pixel SP3 emitting blue light, which is included in each pixel PX. In the entire display area DA, the plurality of optical sensors OS are arrayed in a matrix in the first direction X and the second direction Y.

The optical sensors OS do not need to be arranged for all the pixels PX. For example, one optical sensor OS may be arranged for the plurality of pixels PX. In addition, the optical sensors OS may be arranged for pixels PX in a part of the display area DA and may not be arranged for pixels PX in the other areas.

In the peripheral area PA, which is located on the left and right sides of the display area DA (hereinafter referred to as a left and right frame area), a scanning line/first scanning line drive circuit GD1 and a scanning line/second scanning line drive circuit GD2 are provided. The scanning line/first scanning line drive circuit GD1 and the scanning line/second scanning line drive circuit GD2 may be referred to as peripheral circuits. The display device DSP of the embodiment employs a so-called bilateral power supply system, which can supply power to one pixel PX from both the scanning line/first scanning line drive circuit GD1 and the scanning line/second scanning line drive circuit GD2. The scanning line/first scanning line drive circuit GD1 and the scanning line/second scanning line drive circuit GD2 are connected to a driver IC 4 via a wire (not shown). Incidentally, since the details of the scanning line/first scanning line drive circuit GD1 and the scanning line/second scanning line drive circuit GD2 are described below, their descriptions are omitted here.

The first flexible printed circuit 1 is connected to the terminal portion 3 provided in the mounting area MA. The driver IC 4 is provided on the first flexible printed circuit board 1. The driver IC 4 includes a function corresponding to the display mode for displaying images, a function corresponding to the touch sensing mode for detecting the approach or contact of an object, and a function corresponding to the detection operation of the optical sensor OS. For example, the driver IC 4 is mounted on the first flexible printed circuit board 1 by Chip On Film (COF) using ACF.

A controller CT is provided on the second flexible printed circuit board 2. The detection signals output by the optical sensors OS are output to the controller CT via the driver IC 4. The controller CT executes calculation processing and the like for detecting fingerprints, based on the detection signals from the plurality of optical sensors OS. Incidentally, the calculation processing and the like for detecting fingerprints may be executed by the driver IC 4.

Figure 3:
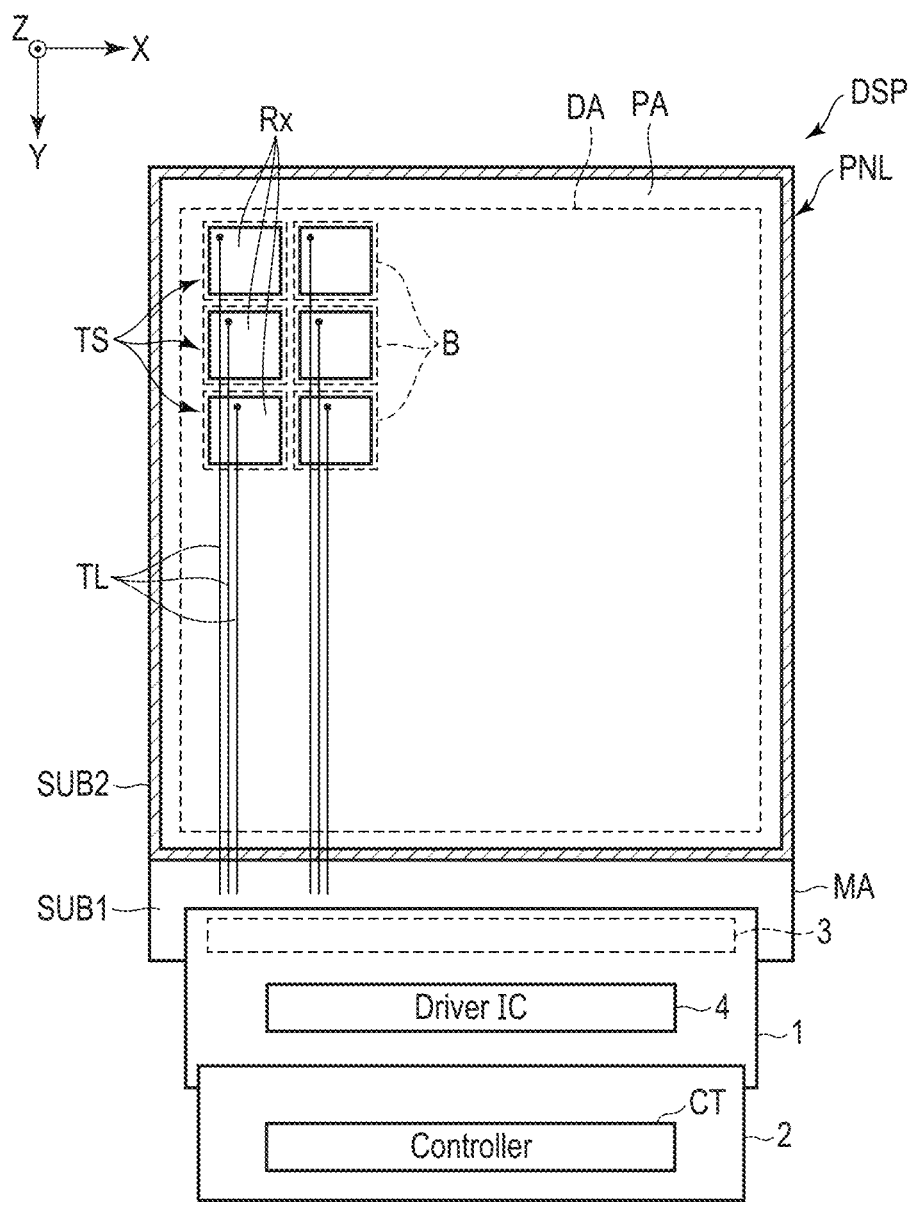
FIG. 3 is a plan view showing a configuration example of a touch sensor mounted on the display device according to the embodiment.

FIG. 3 is a plan view showing a configuration example of a touch sensor TS. A self-capacitive touch sensor TS will be described here, but the touch sensor TS may be a mutual-capacitive sensor. The touch sensor TS comprises a plurality of sensor electrodes Rx and a plurality of touch detection lines TL. The plurality of sensor electrodes Rx are located in the display area DA and arrayed in a matrix in the first direction X and the second direction Y. One sensor electrode Rx overlaps with the plurality of pixels PX shown in FIG. 2 in plan view to constitute one sensor block B. The sensor block B is the minimum unit capable of performing the touch sensing. The plurality of touch detection lines TL extend along the second direction Y and are arranged in the first direction X in the display portion DA. Each of the touch detection lines TL is arranged at a position overlapping with a signal line for transmitting video signals to the pixel PX. Each of the touch detection lines TL is electrically connected to the corresponding sensor electrode Rx. In addition, each of the touch detection lines TL is drawn out to the surrounding area PA and electrically connected to a driver IC 4 via the first flexible printed circuit 1.

In the touch sensing mode, a touch drive voltage is applied to the sensor electrode Rx, and sensing is performed at the sensor electrode Rx. The sensor signal corresponding to the sensing result at the sensor electrode Rx is output to the driver IC 4 via the touch detection line TL. The driver IC 4 or the controller CT detects approaching or contact of an object, and position coordinates of the approaching or contacting object, based on the sensor signal.

In the display mode, a common voltage (Vcom) is applied to the sensor electrode Rx, and the sensor electrode Rx functions as a common electrode.

Figure 4:
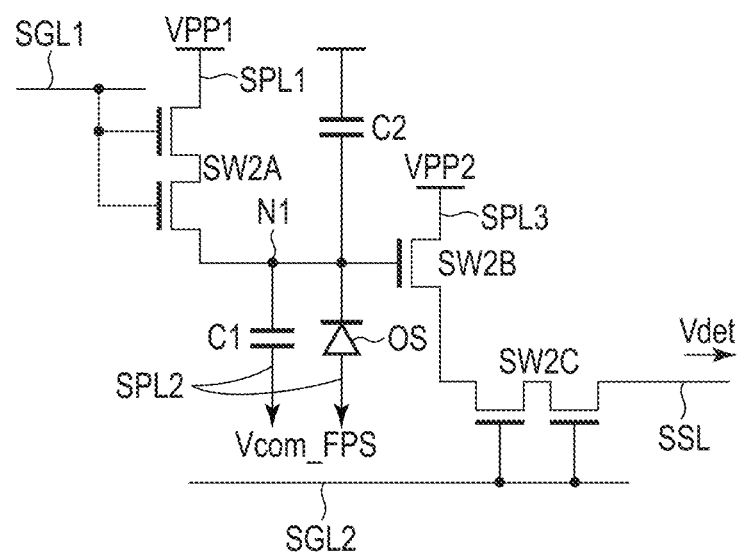
FIG. 4 is an equivalent circuit diagram showing an optical sensor and a sensor circuit connected to the optical sensor, according to the embodiment.

FIG. 4 is an equivalent circuit diagram showing the optical sensor OS and a sensor circuit connected to the optical sensor OS, according to the present embodiment.

As shown in FIG. 4, the sensor circuit includes a first sensor scanning line SGL1, a second sensor scanning line SGL2, a first sensor feed line SPL1, a second sensor feed line SPL2, a third sensor feed line SPL3, a sensor signal line SSL, a switching element SW2A, a switching element SW2B, a switching element SW2C, a capacitor C1, and a capacitor C2.

In the following descriptions, the first sensor scanning line SGL1 is referred to as a first scanning line SGL1, the second sensor scanning line SGL2 is referred to as a second scanning line SGL2, the first sensor feed line SPL1 is referred to as a first feed line SPL1, the second sensor feed line SPL2 is referred to as a second feed line SPL2, and the third sensor feed line SPL3 is referred to as a third feed line SPL3.

In addition, in FIG. 4, each of the switching elements SW2A, SW2B, and SW2C is composed of n-type thin film transistor (TFT), but the switching elements SW2A, SW2B, and SW2C may be composed of p-type TFT.

As for the optical sensor OS, one electrode is connected to the second feed line SPL2, and the other electrode is connected to a node N1. The node N1 is connected to a drain electrode of the switching element SW2A and a gate electrode of the switching element SW2B. One electrode of the optical sensor OS is supplied with a second voltage Vcom_FPS through the second feed line SPL2. The second voltage Vcom_FPS may be referred to as a sensor reference voltage. When light is made incident on the optical sensor OS, a signal (electric charge) corresponding to the amount of incident light is output from the optical sensor OS, and the electric charge fluctuates. Incidentally, the capacitance held in the capacitor C2 is a parasitic capacitance added to the capacitance held in the capacitor C1.

As for the switching element SW2A, a gate electrode is connected to the first scanning line SGL1, a source electrode is connected to the first feed line SPL1, and a drain electrode is connected to the node N1. When the switching element SW2A is turned on in response to the scanning signal supplied from the first scanning line SGL1, the potential of the node N1 (i.e., the potential of the other electrode of the optical sensor OS) is reset to a first potential VPP1 by a first voltage VPP1 supplied through the first feed line SPL1. The first voltage VPP1 may be referred to as a reset voltage. In addition, the switching element SW2A may be referred to as a reset transistor. The second voltage Vcom_FPS indicates a value lower than the first voltage VPP1, and the optical sensor OS is subjected to reverse bias drive.

As for the switching element SW2B, a gate electrode is connected to the node N1, a source electrode is connected to the third feed line SPL3 supplying a third voltage VPP2, and a drain electrode is connected to a source electrode of the switching element SW2C. The gate electrode of the switching element SW2B is supplied with the signal output from the optical sensor OS. The switching element SW2B outputs a voltage signal corresponding to the signal output from the optical sensor OS (i.e., a voltage signal obtained by amplifying the signal output from the optical sensor OS) to the switching element SW2C. The switching element SW2B may be referred to as a source follower transistor.

As for the switching element SW2C, a gate electrode is connected to the second scanning line SGL2, a source electrode is connected to a drain electrode of the switching element SW2B, and a drain electrode is connected to the sensor signal line SSL. When the switching element SW2C is turned on in response to the scanning signal supplied from the second scanning line SGL2, the voltage signal output from the switching element SW2B is output to the sensor signal line SSL as a detection signal Vdet. The switching element SW2C may be referred to as a lead transistor.

Incidentally, FIG. 4 shows a case where the switching elements SW2A and SW2C have a double-gate structure, but the switching elements SW2A and SW2C may have a single-gate structure or a multi-gate structure.

Figure 5:
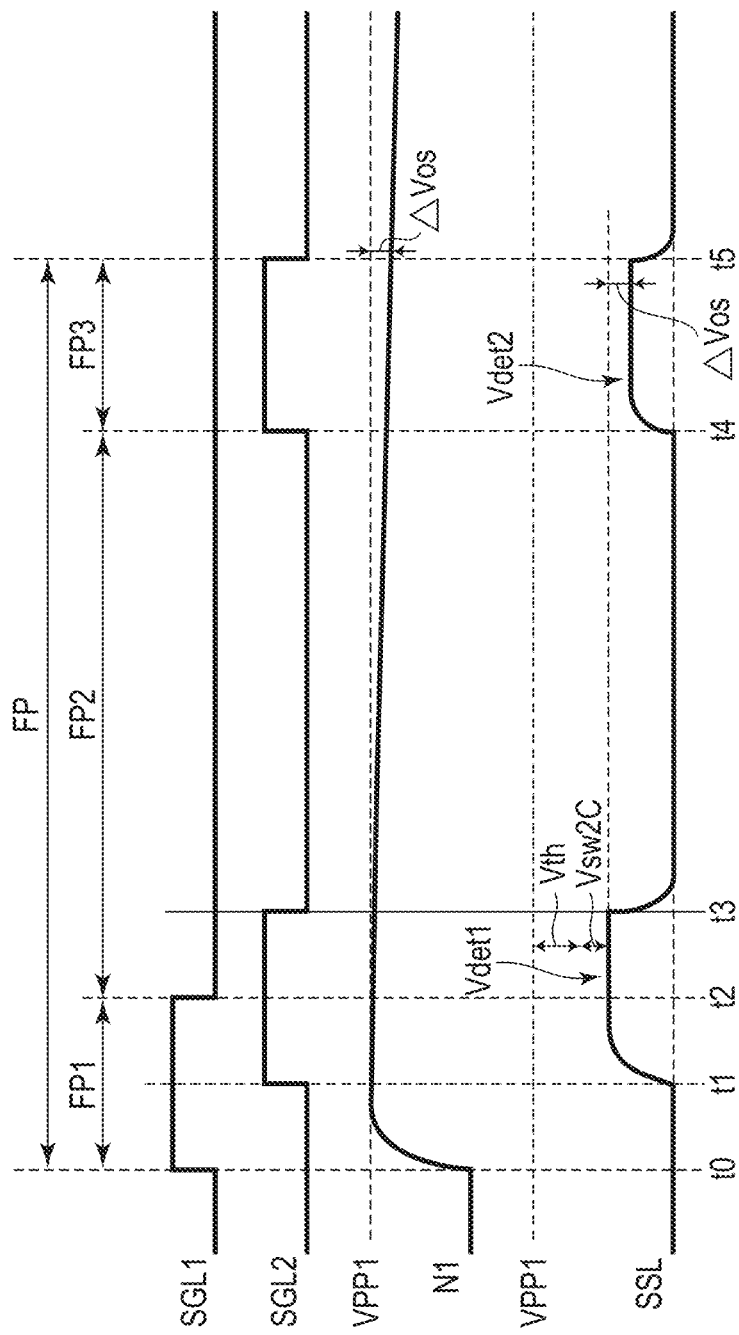
FIG. 5 is a chart illustrating operation examples of the optical sensor and the sensor circuit connected to the optical sensor, according to the embodiment.

FIG. 5 is a chart illustrating operation examples of the optical sensor and the sensor circuit connected to the optical sensor, according to the present embodiment. The optical sensor OS performs capturing fingerprints (detection operation) in a fingerprint imaging period FP shown in FIG. 5. As shown in FIG. 5, the fingerprint imaging period FP includes a reset period FP1, an exposure period FP2, and a read period FP3. Although not shown, one electrode of the sensor SS is supplied with the second voltage Vcom_FPS in the reset period FP1, the exposure period FP2, and the read period FP3.

The reset period FP1 is a period for resetting the potential of the node N1. When the reset period FP1 starts at time t0 and the switching element SW2A is turned on in response to the scanning signal supplied from the first scanning line SGL1, the potential of the node N1 is reset to VPP1 by the first voltage VPP1 supplied through the first feed line SPL1. At time t1, when the switching element SW2C is turned on in response to the scanning signal supplied from the second scanning line SGL2, the detection signal Vdet1 is output to the sensor signal line SSL. The potential of the detection signal Vdet1 is VPP1-Vth-Vsw2c. Vth refers to a threshold voltage of the switching element SW2B, which is a source follower transistor, and Vsw2c refers to a voltage drop caused by the on-resistance of the switching element SW2C.

When the reset period FP1 ends and the exposure period FP2 starts at time t2, the switching element SW2A is turned off. When the exposure period FP2 starts, the potential of the node N1 gradually decreases in accordance with the amount of light incident on the optical sensor OS (i.e., light reflected by the finger) and becomes VPP1-ΔVos. ΔVos refers to the voltage drop which occurs by making the light incident on the optical sensor OS. At time t3 during the exposure period FP2, the switching element SW2C is turned off.

When the exposure period FP2 ends and the read period FP3 starts at time t4, the switching element SW2C is turned on in response to the scanning signal supplied from the second scanning line SGL2, and the detection signal Vdet2 is output to the sensor signal line SSL. The potential of the detection signal Vdet2 is VPP1-Vth-Vsw2c-ΔVos. In other words, the potential of detection signal Vdet2 is lower than the above-described potential of the detection signal Vdet1 by ΔVos. At time t5, the read period FP3 ends.

The controller CT (or the driver IC 4) can compare the potential of the detection signal Vdet1 with the potential of the detection signal Vdet2 and detect the light made incident on the optical sensor OS, based on the difference (i.e., ΔVos). Incidentally, FIG. 5 shows an operation example of one optical sensor OS and one sensor circuit, but all optical sensors OS and all sensor circuits can operate in the same manner. The controller CT (or the driver IC 4) can detect uneven parts of fingers (fingerprints), blood vessel images (vein patterns), and the like by analyzing in-plane distributions of the above-described differences obtained from all optical sensors OS.

Figure 6:
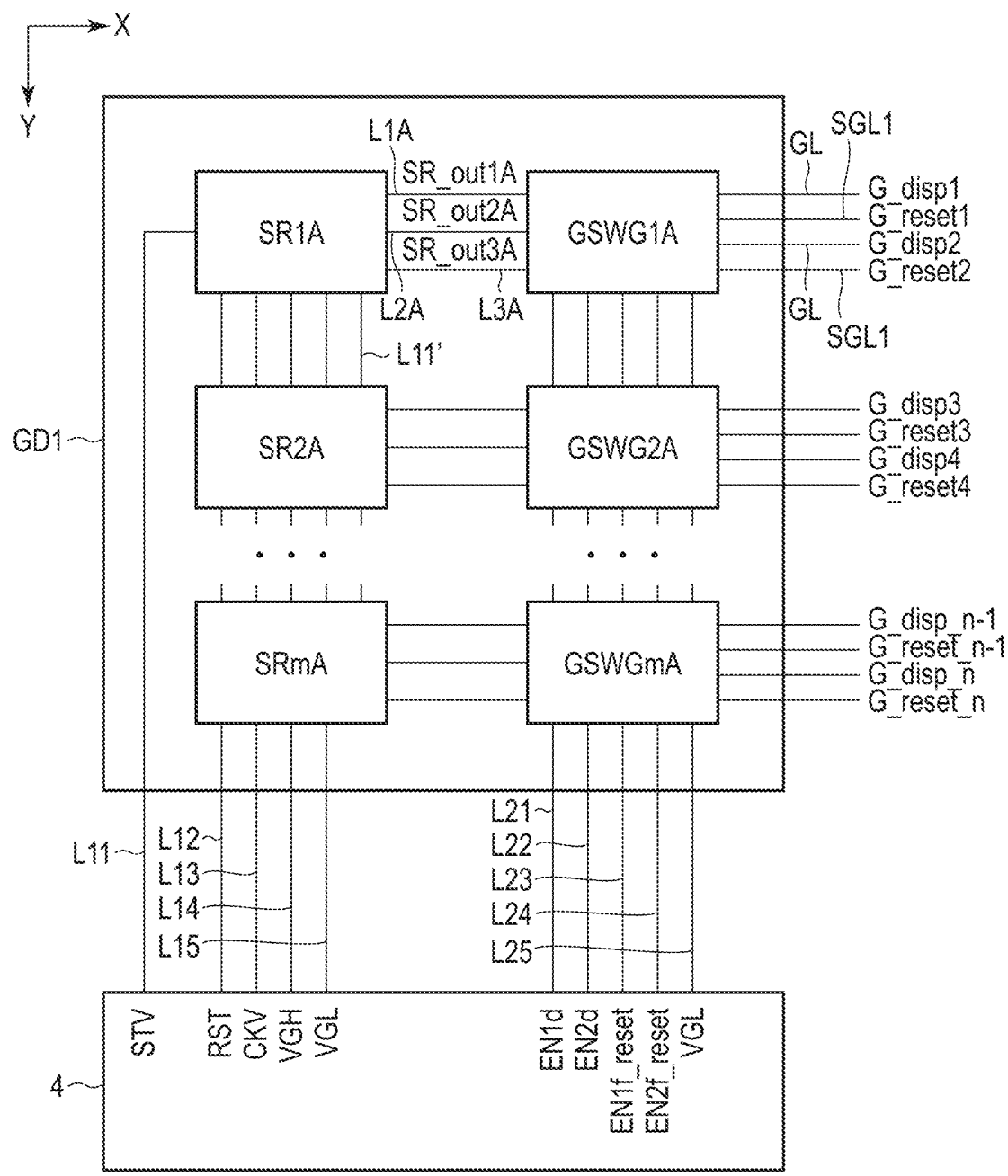
FIG. 6 is a view showing a configuration example of a scanning line/first scanning line drive circuit according to the embodiment.

FIG. 6 is a view showing a configuration example of the scanning line/first scanning line drive circuit GD1 according to the present embodiment.

The scanning line/first scanning line drive circuit GD1 is connected to the driver IC 4. The scanning line/first scanning line drive circuit GD1 operates based on various control signals supplied from the driver IC 4, for example, supplies a scanning signal G_disp to a pixel TFT of each of pixels PX arrayed in a matrix, and supplies a scanning signal G_reset to the sensor circuit connected to the optical sensor OS arranged in each of the pixels PX. The scanning signal G_disp is a signal supplied to write the video signals to each pixel PX and may be referred to as a scanning signal for display. In addition, the scanning signal G_reset is a signal supplied to reset the potential of the node N1 connected to the optical sensor OS, and may be referred to as a first scanning signal for sensor. The scanning line/first scanning line drive circuit GD1 is connected to the pixel TFT for driving each pixel PX via the scanning line GL and is connected to the switching element SW2A in the sensor circuit for driving the optical sensor OS arranged in each pixel PX via the first scanning line SGL1. The scanning lines GL extend along the first direction X and are arranged in the second direction Y. The first scanning lines SGL1 extend along the first direction X and are arranged along the second direction Y. The scanning lines GL and the first scanning lines SGL1 are arranged adjacent to each other in the second direction Y.

The scanning line/first scanning line drive circuit GD1 comprises a plurality of shift registers SR1A, SR2A, ..., SRmA, and a plurality of gate switch groups GSWG1A, GSWG2A, ..., GSWGmA that correspond to the plurality of registers SR1A, SR2A, ..., SRmA, respectively. One shift register SR and the gate switch group GSWG corresponding to the shift register SR are connected via three wires L1A, L2A, and L3A. The wires L1A, L2A, and L3A are wires for supplying control signals SR_out1A, SR_out2A, and SR_out3A output from the shift register SR to the gate switch group GSWG. According to the control signals SR_out1A, SR_out2A, and SR_out3A, turning on/off a plurality of gate switches included in the gate switch group GSWG is controlled.

The plurality of shift registers SR1A, SR2A, ..., SRmA are arranged along the second direction Y. A wire L11 for supplying a start pulse signal STV is connected to the shift register SR1A to be first driven, among the plurality of shift registers SR1A, SR2A, ..., SRmA. The start pulse signal STV is sequentially transferred to the other shift registers SR2A to SRmA via a wire L11'.

Each of the shift registers SR1A, SR2A, ..., SRmA is connected to a wire L12 for supplying a reset signal RST, a wire L13 for supplying the clock signal CKV, a wire L14 for supplying a high potential voltage VGH, and a wire L15 for supplying a low potential voltage VGL. The shift registers SR1A, SR2A, ..., SRmA operate in synchronization with the other shift registers SR, based on the clock signal CKV.

Each of the gate switch groups GSWG1A, GSWG2A, ..., GSWGmA is connected to a wire L21 for supplying an enable signal EN1d, a wire L22 for supplying an enable signal EN2d, a wire L23 for supplying an enable signal EN1f_reset, a wire L24 for supplying an enable signal EN2f_reset, and a wire L25 for supplying the low potential voltage VGL. The enable signals EN1d and EN2d are signals supplied by the driver IC 4 to output the scanning signal G_disp to the scanning line GL, and are signals having a potential higher than the low potential voltage VGL. The enable signals EN1f_reset and EN2f_reset are signals supplied by the driver IC 4 to output the scanning signal G_reset to the first scanning line SGL1, and are signals having a potential higher than the low potential voltage VGL. The enable signal in this specification may be simply referred to as a control signal.

The gate switch group GSWG1A supplies a scanning signal for display G_disp1 to the pixels PX located in the first row, supplies a first scanning signal for sensor G_reset1 to the sensor circuits of the optical sensors OS arranged in the pixels PX located in the first row, supplies a scanning signal for display G_disp2 to the pixels PX located in the second row, and supplies a first scanning signal for sensor G_reset2 to the sensor circuits of the optical sensors OS arranged in the pixels PX located in the second row.

In addition, the gate switch group GSWG2A supplies a scanning signal for display G_disp3 to the pixels PX located in the third row, supplies a first scanning signal for sensor G_reset3 to the sensor circuits of the optical sensors OS arranged in the pixels PX located in the third row, supplies a scanning signal for display G_disp4 to the pixels PX located in the fourth row, and supplies a first scanning signal for sensor G_reset4 to the sensor circuits of the optical sensors OS arranged in the pixels PX located in the fourth row.

Furthermore, the gate switch group GSWGmA supplies a scanning signal for display G_disp_n−1 to the pixels PX located in the n−1-th row, supplies a first scanning signal for sensor G_reset_n−1 to the sensor circuits of the optical sensors OS arranged in the pixels PX located in the n−1-th row, supplies a scanning signal for display G_disp_n to the pixels PX located in the n-th row, and supplies a first scanning signal for sensor G_reset_n to the sensor circuits of the optical sensors OS arranged in the pixels PX located in the n-th row.

Figure 7:
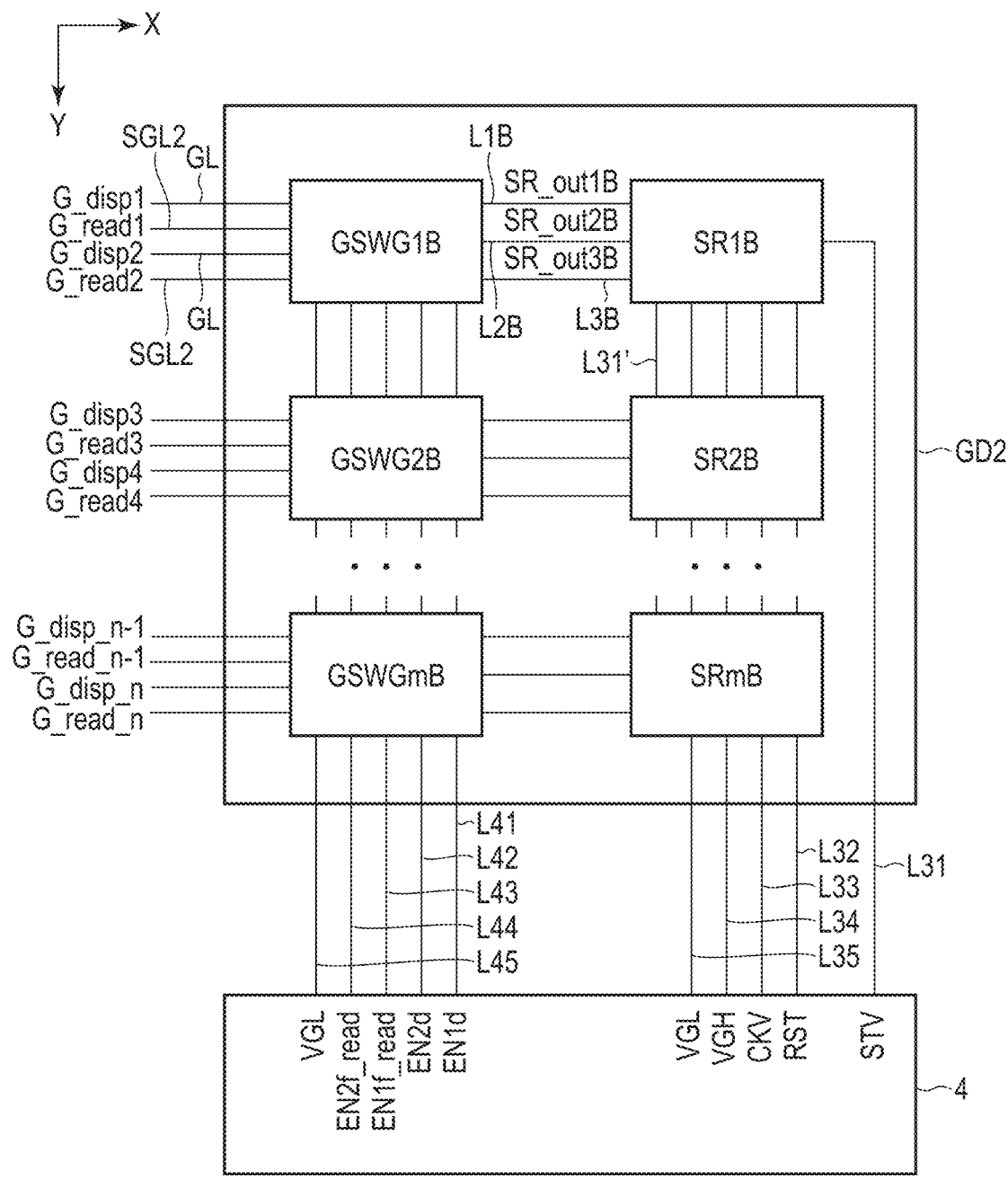
FIG. 7 is a view showing a configuration example of a scanning line/second scanning line drive circuit according to the embodiment.

FIG. 7 is a view showing a configuration example of the scanning line/second scanning line drive circuit GD2 according to the present embodiment.

The scanning line/second scanning line drive circuit GD2 is connected to the driver IC 4. The scanning line/second scanning line drive circuit GD2 operates based on various control signals supplied from the driver IC 4, for example, supplies the scanning signal G_disp to the pixels TFT of each of the pixels PX arrayed in a matrix, and supplies a scanning signal G_read to the sensor circuit connected to the optical sensor OS arranged in each of the pixels PX. The scanning signal G_read is a signal supplied to read the detection signal Vdet from the optical sensor OS and may be referred to as a second scanning signal for sensor. The scanning line/second scanning line drive circuit GD2 is connected to the pixel TFT for driving each pixel PX via the scanning line GL and is connected to the switching element SW2C in the sensor circuit for driving the optical sensor OS arranged in each pixel PX via the second scanning line SGL2. The second scanning lines SGL2 extend along the first direction X and are arranged along the second direction Y. The scanning lines GL and the second scanning lines SGL2 are arranged adjacent to each other in the second direction Y.

The scanning line/second scanning line drive circuit GD2 comprises a plurality of shift registers SR1B, SR2B, . . . , SRmB, and a plurality of gate switch groups GSWG1B, GSWG2B, . . . , GSWGmB that correspond to the plurality of registers SR1B, SR2B, . . . , SRmB, respectively, similarly to the scanning line/first scanning line drive circuit GD1. One shift register SR and the gate switch group GSWG corresponding to the shift register SR are connected via three wires L1B, L2B, and L3B. The wires L1B, L2B, and L3B are wires for supplying control signals SR_out1B, SR_out2B, and SR_out3B output from the shift register SR to the gate switch group GSWG. According to the control signals SR_out1B, SR_out2B, and SR_out3B, turning on/off a plurality of gate switches included in the gate switch group GSWG is controlled.

The plurality of shift registers SR1B, SR2B, . . . , SRmB are arranged along the second direction Y. A wire L31 for supplying a start pulse signal STV is connected to the shift register SR1B to be first driven, among the plurality of shift registers SR1B, SR2B, . . . , SRmB. The start pulse signal STV is sequentially transferred to the other shift registers SR2B to SRmB via a wire L31'.

Each of the shift registers SR1B, SR2B, . . . , SRmB is connected to a wire L32 for supplying a reset signal RST, a wire L33 for supplying the clock signal CKV, a wire L34 for supplying a high potential voltage VGH, and a wire L35 for supplying a low potential voltage VGL. The shift registers SR1B, SR2B, . . . , SRmB operate in synchronization with the other shift registers SR, based on the clock signal CKV.

Each of the gate switch groups GSWG1B, GSWG2B, . . . , GSWGmB is connected to a wire L41 for supplying an enable signal EN1$d$, a wire L42 for supplying an enable signal EN2$d$, a wire L43 for supplying an enable signal EN1$f$_read, a wire L44 for supplying an enable signal EN2$f$_read, and a wire L45 for supplying the low potential voltage VGL. The enable signals EN1$f$_read and EN2$f$_read are signals supplied by the driver IC 4 to output the scanning signal G_read to the second scanning line SGL2, and are signals having a potential higher than the low potential voltage VGL.

The gate switch group GSWG1B supplies a scanning signal for display G_disp1 to the pixels PX located in the first row, supplies a second scanning signal for sensor G_read1 to the sensor circuits of the optical sensors OS arranged in the pixels PX located in the first row, supplies a scanning signal for display G_disp2 to the pixels PX located in the second row, and supplies a second scanning signal for sensor G_read2 to the sensor circuits of the optical sensors OS arranged in the pixels PX located in the second row.

In addition, the gate switch group GSWG2B supplies a scanning signal for display G_disp3 to the pixels PX located in the third row, supplies a second scanning signal for sensor G_read3 to the sensor circuits of the optical sensors OS arranged in the pixels PX located in the third row, supplies a scanning signal for display G_disp4 to the pixels PX located in the fourth row, and supplies a second scanning signal for sensor G_read4 to the sensor circuits of the optical sensors OS arranged in the pixels PX located in the fourth row.

Furthermore, the gate switch group GSWGmB supplies a scanning signal for display G_disp_n−1 to the pixels PX located in the n−1-th row, supplies a second scanning signal for sensor G_read_n−1 to the sensor circuits of the optical sensors OS arranged in the pixels PX located in the n−1-th row, supplies a scanning signal for display G_disp_n to the pixels PX located in the n-th row, and supplies a second scanning signal for sensor G_read_n to the sensor circuits of the optical sensors OS arranged in the pixels PX located in the n-th row.

Figure 8:
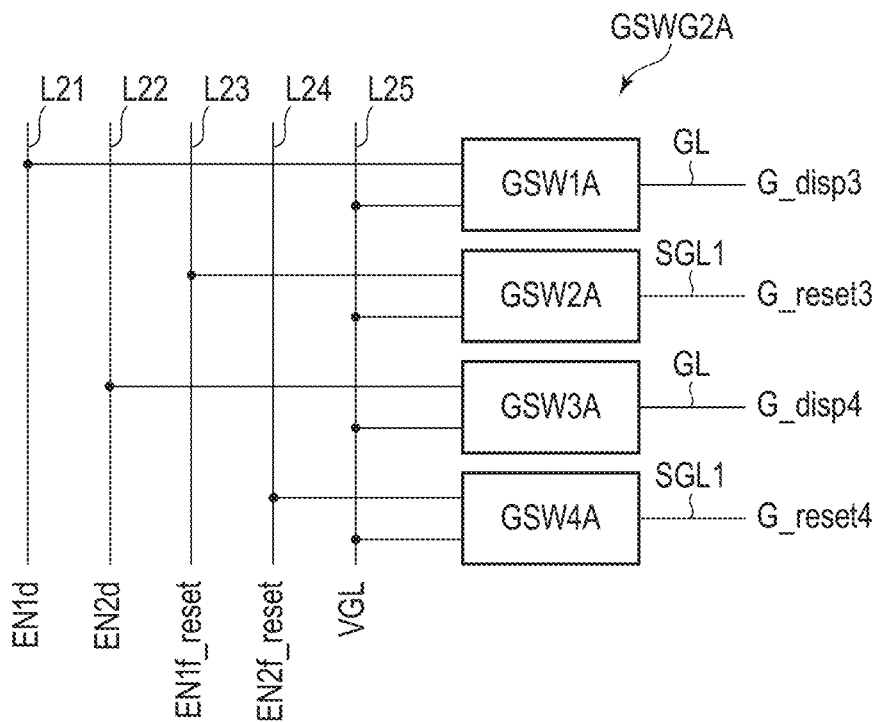
FIG. 8 is a view showing a configuration example of a gate switch group included in the scanning line/first scanning line drive circuit shown in FIG. 6.

FIG. 8 is a view showing a configuration example of the gate switch group GSWG2A included in the scanning line/first scanning line drive circuit GD1 shown in FIG. 6. The gate switch group GSWG2A will be described here as one of the gate switch groups GSWG included in the scanning line/first scanning line drive circuit GD1, but the other gate switch groups GSWG1A and GSWGmA also have the same configuration as the gate switch group GSWG2A.

The gate switch group GSWG2A comprises four gate switches GSW1A to GSW4A.

The gate switch GSW1A is connected to the wire L21 for supplying the enable signal EN1*d*, the wire L25 for supplying the low potential voltage VGL, and the scanning line GL for supplying the display scanning signal G_disp (in this case, the scanning signal for display G_disp3).

The gate switch GSW2A is connected to the wire L23 for supplying the enable signal EN1*f*_reset, the wire L25 for supplying the low potential voltage VGL, and the first scanning line SGL1 for supplying the first scanning signal for sensor G_reset (in this case, the first scanning signal for display G_reset3).

The gate switch GSW3A is connected to the wire L22 for supplying the enable signal EN2*d*, the wire L25 for supplying the low potential voltage VGL, and the scanning line GL for supplying the scanning signal for display G_disp (in this case, the scanning signal for display G_disp4).

The gate switch GSW4A is connected to the wire L24 for supplying the enable signal EN2*f*_reset, the wire L25 for supplying the low potential voltage VGL, and the first scanning line SGL1 for supplying the first scanning signal for sensor G_reset (in this case, the first scanning signal for display G_reset4).

Although not shown in FIG. 8, the gate switches GSW1A to GSW4A are also connected to the wires L1A to L3A shown in FIG. 6, and turning on/off the gate switches GSW1A to GSW4A is controlled based on control signals SR_out1A to SR_out3A supplied via these wires L1A to L3A.

Figure 9:
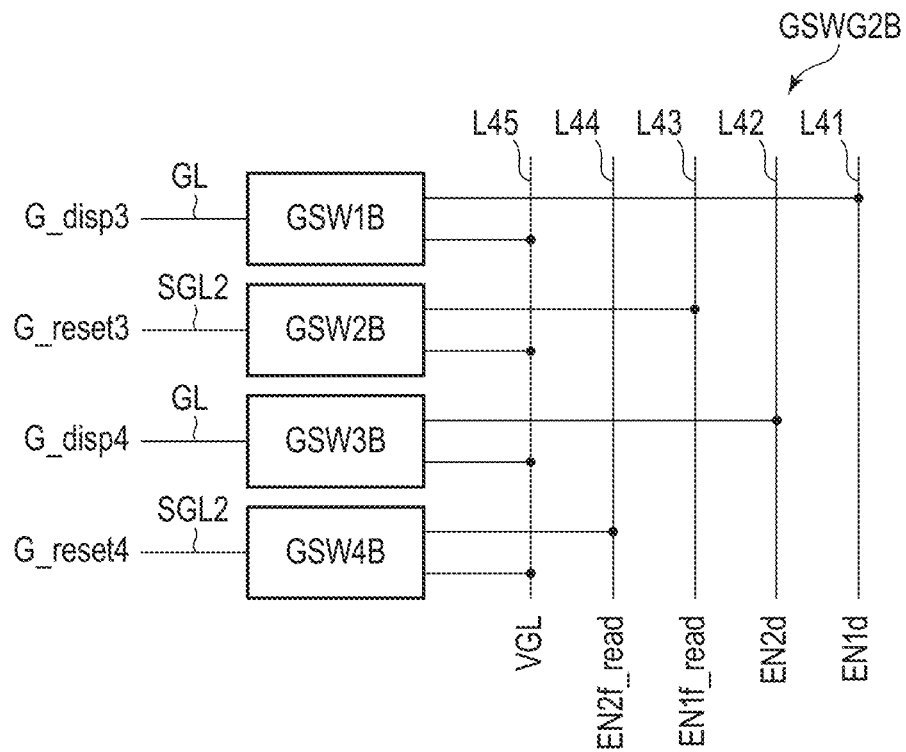
FIG. 9 is a view showing a configuration example of a gate switch group included in the scanning line/second scanning line drive circuit shown in FIG. 7.

FIG. 9 is a view showing a configuration example of the gate switch group GSWG2B included in the scanning line/second scanning line drive circuit GD2 shown in FIG. 7. The gate switch group GSWG2B will be described here as one of the gate switch groups GSWG included in the scanning line/second scanning line drive circuit GD2, but the other gate switch groups GSWG1B and GSWGmB also have the same configuration as the gate switch group GSWG2B.

The gate switch group GSWG2B comprises four gate switches GSW1B to GSW4B.

The gate switch GSW1B is connected to the wire L41 for supplying the enable signal EN1*d*, the wire L45 for supplying the low potential voltage VGL, and the scanning line GL for supplying the scanning signal for display G_disp (in this case, the scanning signal for display G_disp3).

The gate switch GSW2B is connected to the wire L43 for supplying the enable signal EN1*f*_read, the wire L45 for supplying the low potential voltage VGL, and the second scanning line SGL2 for supplying the second scanning signal for sensor G_read (in this case, the second scanning signal for sensor G_read3).

The gate switch GSW3B is connected to the wire L42 for supplying the enable signal EN2*d*, the wire L45 for supplying the low potential voltage VGL, and the scanning line GL for supplying the scanning signal for display G_disp (in this case, the scanning signal for display G_disp4).

The gate switch GSW4B is connected to the wire L44 for supplying the enable signal EN2*f*_read, the wire L45 for supplying the low potential voltage VGL, and the second scanning line SGL2 for supplying the second scanning signal for sensor G_read (in this case, the second scanning signal for sensor G_read4).

Although not shown in FIG. 9, the gate switches GSW1B to GSW4B are also connected to the wires L1B to L3B shown in FIG. 7, and turning on/off the gate switches GSW1B to GSW4B is controlled based on control signals SR_out1B to SR_out3B supplied via these wires L1B to L3B.

Figure 10:
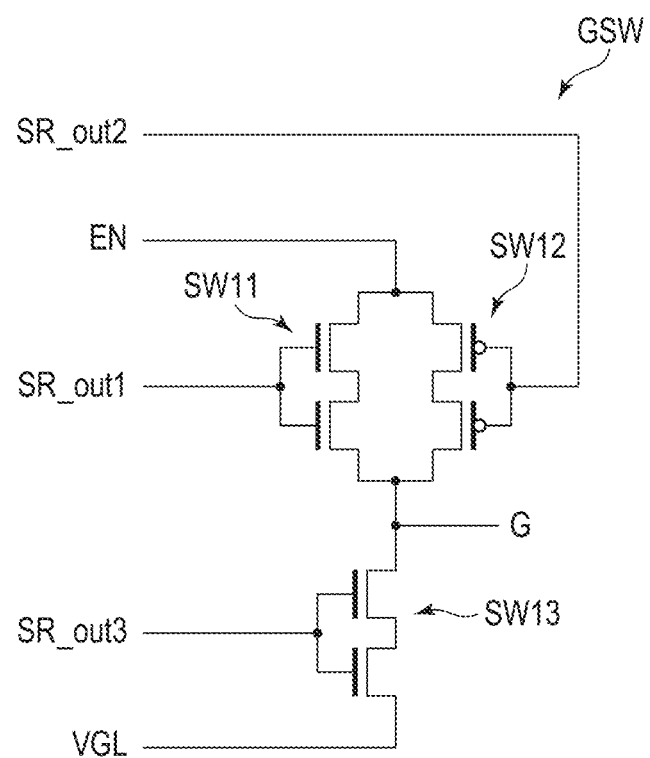
FIG. 10 is a view showing a configuration example of a gate switch according to the embodiment.

FIG. 10 is a view showing a configuration example of the gate switch GSW. The gate switches GSW1A to GSW4A and GSW1B to GSW4B included in the scanning line/first scanning line drive circuit GD1 and scanning line/second scanning line drive circuit GD2, respectively, have the configuration shown in FIG. 10.

The gate switch GSW comprises three switching elements SW11 to SW13. It is shown that three switching elements SW11 to SW13 have the double-gate structure, but the switching elements SW11 to SW13 may have a single-gate structure or a multi-gate structure.

The switching element SW11 is an n-type TFT where the gate electrode is connected to the wires (wires L1A and L1B) for supplying the control signal SR_out1, the source electrode is connected to the wire (more specifically, any of the wires L21 to L24 and L41 to L44) for supplying various enable signals EN, and the drain electrode is connected to the wire (more specifically, any of the scanning line GL, the first scanning line SGL1, and the second scanning line SGL2) for supplying various scanning signals G. The switching element SW11 is turned on when a high-level control signal SR_out1 is supplied to the gate electrode, and is turned off when a low-level control signal SR_out1 is supplied to the gate electrode.

The switching element SW12 is a p-type TFT where the gate electrode is connected to the wires (wires L2A and L2B) for supplying the control signal SR_out2, the drain electrode is connected to the wire (more specifically, any of the wires L21 to L24 and L41 to L44) for supplying various enable signals EN, and the source electrode is connected to the wire (more specifically, any of the scanning line GL, the first scanning line SGL1, and the second scanning line SGL2) for supplying various scanning signals G. The switching element SW12 is turned on when a low-level control signal SR_out2 is supplied to the gate electrode, and is turned off when a high-level control signal SR_out2 is supplied to the gate electrode.

The switching element SW13 is an n-type TFT where the gate electrode is connected to the wires (wires L1A and L1B) for supplying the control signal SR_out3, the source electrode is connected to the wire (wires L25 and L45) for supplying the low potential voltage VGL, and the drain electrode is connected to the wire (more specifically, any of the scanning line GL, the first scanning line SGL1, and the second scanning line SGL2) for supplying various scanning signals G. The switching element SW13 is turned on when a high-level control signal SR_out3 is supplied to the gate electrode, and is turned off when a low-level control signal SR_out3 is supplied to the gate electrode.

When the switching elements SW11 and SW12 are turned on, the switching element SW13 is turned off, and various scanning signals G based on various enable signals EN are output to the various scanning lines. In contrast, when the switching elements SW11 and SW12 are turned off, the switching element SW13 is turned on, and the low potential voltage VGL is supplied to the various scanning lines. In this specification, turning on the gate switch GSW refers to the state in which the switching elements SW11 and SW12 are turned on, and turning off the gate switch GSW refers to the state in which the switching elements SW11 and SW12 are turned off.

Figure 11:
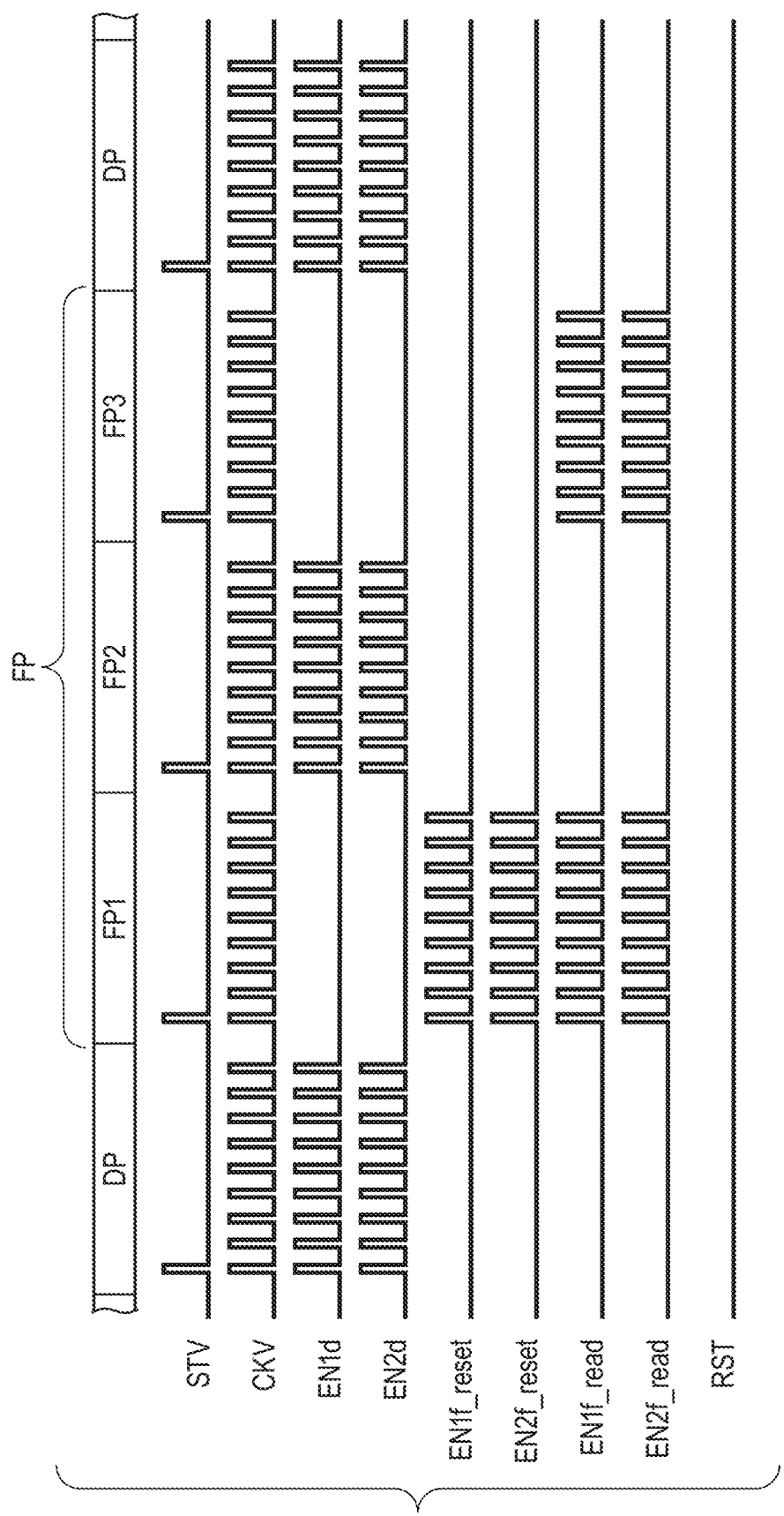
FIG. 11 is a timing chart showing operation examples of the scanning line/first scanning line drive circuit and the scanning line/second scanning line drive circuit according to the embodiment.

FIG. 11 is a timing chart showing operation examples of the scanning line/first scanning line drive circuit GD1 and the scanning line/second scanning line drive circuit GD2.

The scanning line/first scanning line drive circuit GD1 and the scanning line/second scanning line drive circuit GD2 operate in accordance with the start pulse signal STV input for each frame and perform various controls to be described below.

In the display period DP for displaying images, the scanning line/first scanning line driving circuit GD1 and the scanning line/second scanning line driving circuit GD2 perform display control to display images in the display area DA. Although details are described below, the scanning line/first scanning line drive circuit GD1 and the scanning line/second scanning line drive circuit GD2 output the scanning signals for display G_disp to the scanning line GL in accordance with the clock signal CKV, the enable signal EN1$d$, and the enable signal EN2$d$, in the display period DP.

In a fingerprint imaging period FP for capturing fingerprints, the scanning line/first scanning line drive circuit GD1 and the scanning line/second scanning line drive circuit GD2 perform control to capture fingerprints (to detect uneven parts of a finger). The fingerprint imaging period FP includes the reset period FP1, the exposure period FP2, and the read period FP3, as described above.

Although details are described below, the scanning line/first scanning line drive circuit GD1 outputs the first scanning signal for sensor G_reset to the first scanning line SGL1 in accordance with the clock signal CKV, the enable signal EN1$f$_reset, and the enable signal EN2$f$_reset, in the reset period FP1. In addition, the scanning line/second scanning line drive circuit GD2 outputs the second scanning signal for sensor G_read to the second scanning line SGL2 in accordance with the clock signal CKV, the enable signal EN1$f$_read, and the enable signal EN2$f$_read.

In the exposure period FP2, the scanning line/first scanning line drive circuit GD1 and the scanning line/second scanning line drive circuit GD2 operate in the same manner as that in the display period DP. In other words, the scanning line/first scanning line drive circuit GD1 and the scanning line/second scanning line drive circuit GD2 output the scanning signals for display G_disp to the scanning line GL in accordance with the clock signal CKV, the enable signal EN1$d$, and the enable signal EN2$d$.

Although details are described below, the scanning line/second scanning line drive circuit GD2 outputs the second scanning signal for sensor G_read to the second scanning line SGL2 in accordance with the clock signal CKV, the enable signal EN1$f$_read, and the enable signal EN2$f$_read, in the read period FP3.

Although detailed descriptions are omitted here, an operation of identifying a position (relevant part) where an object is approaching or in close proximity is performed by the touch sensor TS immediately before the reset period FP1. In the reset period FP1 and the read period FP3, the scanning line/first scanning line drive circuit GD1 and the scanning line/second scanning line drive circuit GD2 operate as described above for the relevant portion identified by the touch sensor TS. In contrast, as for a non-relevant part other than the above-mentioned relevant part, the scanning line/first scanning line drive circuit GD1 and scanning line/second scanning line drive circuit GD2 perform a high-speed scanning operation of the shift register corresponding to the non-relevant part in the reset period FP1 and the read period FP3. According to such a high-speed scanning operation, the time to read the detection signals Vdet1 and Vdet2 can be secured.

Figure 12:
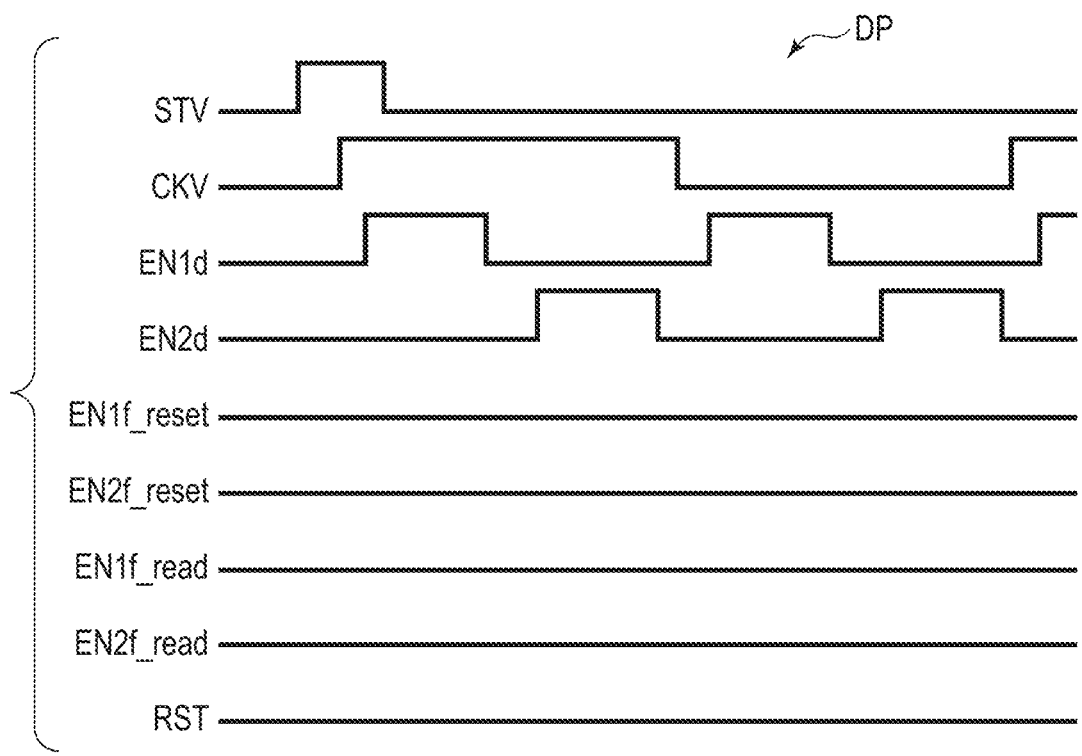
FIG. 12 is a timing chart showing operation examples of the scanning line/first scanning line drive circuit and the scanning line/second scanning line drive circuit in a display period shown in FIG. 11.

FIG. 12 is a timing chart showing operation examples of the scanning line/first scanning line drive circuit GD1 and the scanning line/second scanning line drive circuit GD2 in the display period DP.

When the display period DP is started and the start pulse signal STV is supplied to the shift register SR1A in the scanning line/first scanning line drive circuit GD1 and the shift register SR1B in the scanning line/second scanning line drive circuit GD2, the shift register SR1A outputs the high-level control signal SR_out1A, the low-level control signal SR_out2A, and the low-level control signal SR_out3A to the gate switch GSWG1A included in the corresponding gate switch group GSWG1A, and outputs the low-level control signal SR_out1A, the high-level SR_out2A, and the high-level SR_out3A to the other gate switches GSW2A to GSW4A. In addition, the shift register SR1B outputs the high-level control signal SR_out1B, the low-level control signal SR_out2B, and the low-level control signal SR_out3B to the gate switch GSW1B included in the corresponding gate switch group GSWG1B, and outputs the low-level control signal SR_out1B, the high-level control signal SR_out2B, and the high-level control signal SR_out3B to the other gate switches GSW2B to GSW4B. According to this, the switching elements SW11 and SW12 included in the respective gate switches GSW1A and GSW1B are turned on.

After the gate switches GSW1A and GSW1B are in the above-described state, the enable signal EN1$d$ is supplied to the gate switches GSW1A and GSW1B in a period in which the potential of the clock signal CKV changes from high to low. When the enable signal EN1$d$ is supplied to the gate switches GSW1A and GSW1B, the scan signal for display G_disp1 is output from the gate switches GSW1A and GSW1B to the corresponding scanning line GL (in this case, the scanning line GL connected to the pixels PX located in the first row).

After the enable signal EN1$d$ is supplied to the gate switches GSW1A and GSW1B, the shift register SR1A outputs the high-level control signal SR_out1A, the low-level control signal SR_out2A, and the low-level control signal SR_out3A to the gate switch GSW3A included in the corresponding gate switch group GSWG1A, and outputs the low-level control signal SR_out1A, the high-level control signal SR_out2A, and the high-level control signal SR_out3A to the other gate switches GSW1A, GSW2A, and GSW4A. In addition, the shift register SR1B outputs the high-level control signal SR_out1B, the low-level control signal SR_out2B, and the low-level control signal SR_out3B to the gate switch GSW3B included in the corresponding gate switch group GSWG1B, and outputs the low-level control signal SR_out1B, the high-level control signal SR_out2B, and the high-level control signal SR_out3B to the other gate switches GSW1B, GSW2B, and GSW4B. According to this, the switching elements SW11 and SW12 included in the respective gate switches GSW3A and GSW3B are turned on.

After the gate switches GSW3A and GSW3B are in the above-described state, the enable signal EN2$d$ is supplied to the gate switches GSW3A and GSW3B in a period in which the potential of the clock signal CKV changes from high to low. When the enable signal EN2$d$ is supplied to the gate switches GSW3A and GSW3B, the scan signal for display G_disp2 is output from the gate switches GSW3A and GSW3B to the corresponding scanning line GL (in this case, the scanning line GL connected to the pixels PX located in the second row).

When the potential of the clock signal CKV changes from high to low, the start pulse signal STV is transferred from the shift register SR1A to the next shift register SR2A in the scanning line/first scanning line drive circuit GD1. Similarly, the start pulse signal STV is transferred from the shift register SR1B to the next shift register SR2B in the scanning line/second scanning line drive circuit GD2. The shift registers SR2A and SR2B, which receive the start pulse signals STV transferred from the shift registers SR1A and SR1B, respectively, and the gate switch groups GSWG2A and GSWG2B corresponding to the shift registers SR2A and SR2B, operate in the same manner as the shift registers SR1A and SR1B and the gate switch groups GSWG1A and GSWG1B corresponding to the shift registers SR1A and SR1B in a period in which the potential of the clock signal CKV changes from low to high. After that, the same operation is repeated in the last shift register SRmA and SRmB and the gate switch groups GSWGmA and GSWGmB corresponding to these shift registers SRmA and SRmB.

In the display period DP, the enable signals EN1$f$_reset and EN2$f$_reset are not supplied to the gate switches GSW2A and GSW4A included in each gate switch group GSWG in the scanning line/first scanning line drive circuit GD1 (i.e., the first scanning signal for sensor G_reset is not output from the scanning line/first scanning line drive circuit GD1 to the first scanning line SGL1). In addition, in the display period DP, the enable signals EN1$f$_read and EN2$f$_read are not supplied to the gate switches GSW2B and GSW4B included in each gate switch group GSWG in the scanning line/second scanning line drive circuit GD2 (i.e., the second scanning signal for sensor G_read is not output from the scanning line/second scanning line drive circuit GD2 to the second scanning line SGL2).

Figure 13:
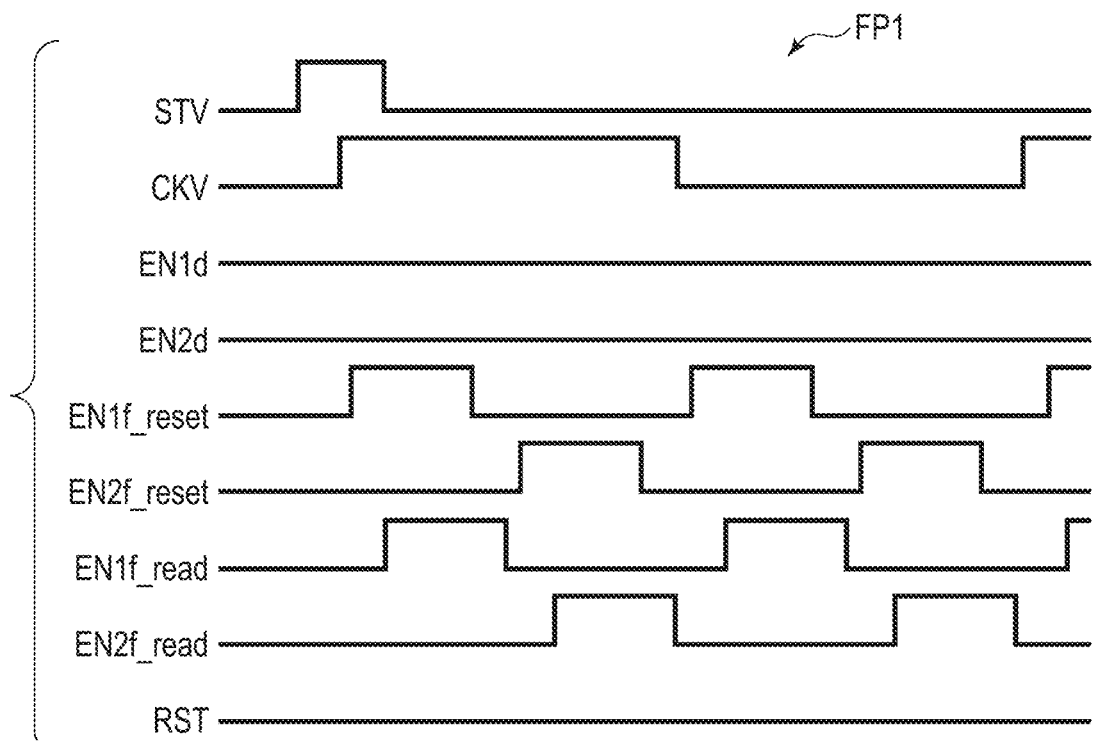
FIG. 13 is a timing chart showing operation examples of the scanning line/first scanning line drive circuit and the scanning line/second scanning line drive circuit in a reset period shown in FIG. 11.

FIG. 13 is a timing chart showing operation examples of the scanning line/first scanning line drive circuit GD1 and the scanning line/second scanning line drive circuit GD2 in the reset period FP1 included in the fingerprint imaging period FP.

When the reset period FPI included in the fingerprint imaging period FP is started and the start pulse signal STV is supplied to the shift register SR1A in the scanning line/first scanning line drive circuit GD1 and the shift register SR1B in the scanning line/second scanning line drive circuit GD2, the shift register SR1A outputs the high-level control signal SR_out1A, the low-level control signal SR_out2A, and the low-level control signal SR_out3A to the gate switch GSWG2A included in the corresponding gate switch group GSWG1A, and outputs the low-level control signal SR_out1A, the high-level SR_out2A, and the high-level SR_out3A to the other gate switches GSW1A, GSW3A, and GSW4A. In addition, the shift register SR1B outputs the high-level control signal SR_out1B, the low-level control signal SR_out2B, and the low-level control signal SR_out3B to the gate switch GSW2B included in the corresponding gate switch group GSWG1B, and outputs the low-level control signal SR_out1B, the high-level control signal SR_out2B, and the high-level control signal SR_out3B to the other gate switches GSW1B, GSW3B, and GSW4B. According to this, the switching elements SW11 and SW12 included in the respective gate switches GSW2A and GSW2B are turned on.

In the gate switch group GSWG1A, the enable signal EN1$f$_reset is supplied to the gate switch GSW2A after the gate switch GSW2A becomes the above-described state and after the potential of the clock signal CKV changes from low to high. When the enable signal EN1$f$_reset is supplied to the gate switch GSW2A, the first scanning signal for sensor G_reset1 is output from the gate switch GSW2A to the corresponding first scanning line SGL1 (in this case, the first scanning line SGL1 connected to the switching element SW2A included in the sensor circuit of the optical sensor OS located in the first row).

In contrast, in the gate switch group GSWG1B, the enable signal EN1$f$_read is supplied to the gate switch GSW2B after the gate switch GSW2B becomes the above-described state and after the potential of the clock signal CKV changes from low to high. Incidentally, the enable signal EN1$f$_read is supplied a little later than the timing when the above-described enable signal EN1$f$_reset is supplied to gate switch GSW2A of the gate switch group GSWG1A. When the enable signal EN1$f$_read is supplied to the gate switch GSW2B, the second scanning signal for sensor G_read1 is output from the gate switch GSW2B to the corresponding second scanning line SGL2 (in this case, the second scanning line SGL2 connected to the switching element SW2C included in the sensor circuit of the optical sensor OS located in the first row).

After the enable signals EN1$f$_reset and EN1$f$_read are supplied to the gate switches GSW2A and GSW2B, the shift register SR1A outputs the high-level control signal SR_out1A, the low-level control signal SR_out2A, and the low-level control signal SR_out3A to the gate switch GSW4A included in the corresponding gate switch group GSWG1A, and outputs the low-level control signal SR_out1A, the high-level control signal SR_out2A, and the high-level control signal SR_out3A to the other gate switches GSW1A to GSW3A. In addition, the shift register SR1B outputs the high-level control signal SR_out1B, the low-level control signal SR_out2B, and the low-level control signal SR_out3B to the gate switch GSW4B included in the corresponding gate switch group GSWG1B, and outputs the low-level control signal SR_out1B, the high-level control signal SR_out2B, and the high-level control signal SR_out3B to the other gate switches GSW1B to GSW3B. According to this, the switching elements SW11 and SW12 included in the respective gate switches GSW4A and GSW4B are turned on.

In the gate switch group GSWG1A, the enable signal EN2$f$_reset is supplied to the gate switch GSW4A after the gate switch GSW4A becomes the above-described state and after the potential of the clock signal CKV changes from low to high. When the enable signal EN2$f$_reset is supplied to the gate switch GSW4A, the first scanning signal for sensor G_reset2 is output from the gate switch GSW4A to the corresponding first scanning line SGL1 (in this case, the first scanning line SGL1 connected to the switching element SW2A included in the sensor circuit of the optical sensor OS located in the second row).

In contrast, in the gate switch group GSWG1B, the enable signal EN2$f$_read is supplied to the gate switch GSW4B after the gate switch GSW4B becomes the above-described state and after the potential of the clock signal CKV changes from low to high. Incidentally, the enable signal EN2$f$_read is supplied a little later than the timing when the above-described enable signal EN2$f$_reset is supplied to gate switch GSW4A of the gate switch group GSWG1A. When the enable signal EN2$f$_read is supplied to the gate switch GSW4B, the second scanning signal for sensor G_read2 is output from the gate switch GSW4B to the corresponding second scanning line SGL2 (in this case, the second scanning line SGL2 connected to the switching element SW2C included in the sensor circuit of the optical sensor OS located in the second row).

When the potential of the clock signal CKV changes from high to low, the start pulse signal STV is transferred from the shift register SR1A to the next shift register SR2A in the scanning line/first scanning line drive circuit GD1. Similarly, the start pulse signal STV is transferred from the shift register SR1B to the next shift register SR2B in the scanning line/second scanning line drive circuit GD2. The shift registers SR2A and SR2B, which receive the start pulse signals STV transferred from the shift registers SR1A and SR1B, respectively, and the gate switch groups GSWG2A and GSWG2B corresponding to the shift registers SR2A and SR2B, operate in the same manner as the shift registers SR1A and SR1B and the gate switch groups GSWG1A and GSWG1B corresponding to the shift registers SR1A and SR1B in a period in which the potential of the clock signal CKV changes from low to high. After that, the same operation is repeated in the last shift register SRmA and SRmB and the gate switch groups GSWGmA and GSWGmB corresponding to these shift registers SRmA and SRmB.

Incidentally, in the reset period FP1, the enable signals EN1$d$ and EN2$d$ are not supplied to the gate switches GSW1A and GSW3A included in each gate switch group GSWG in the scanning line/first scanning line drive circuit GD1 (i.e., the scanning signal for display G_disp is not output from the scanning line/first scanning line drive circuit GD1 to the scanning line GL). Similarly, the enable signals EN1$d$ and EN2$d$ are not supplied to the gate switches GSW1B and GSW3B included in each gate switch group GSWG in the scanning line/second scanning line drive circuit GD2 (i.e., the scanning signal for display G_disp is not output from the scanning line/second scanning line drive circuit GD2 to the scanning line GL).

Figure 14:
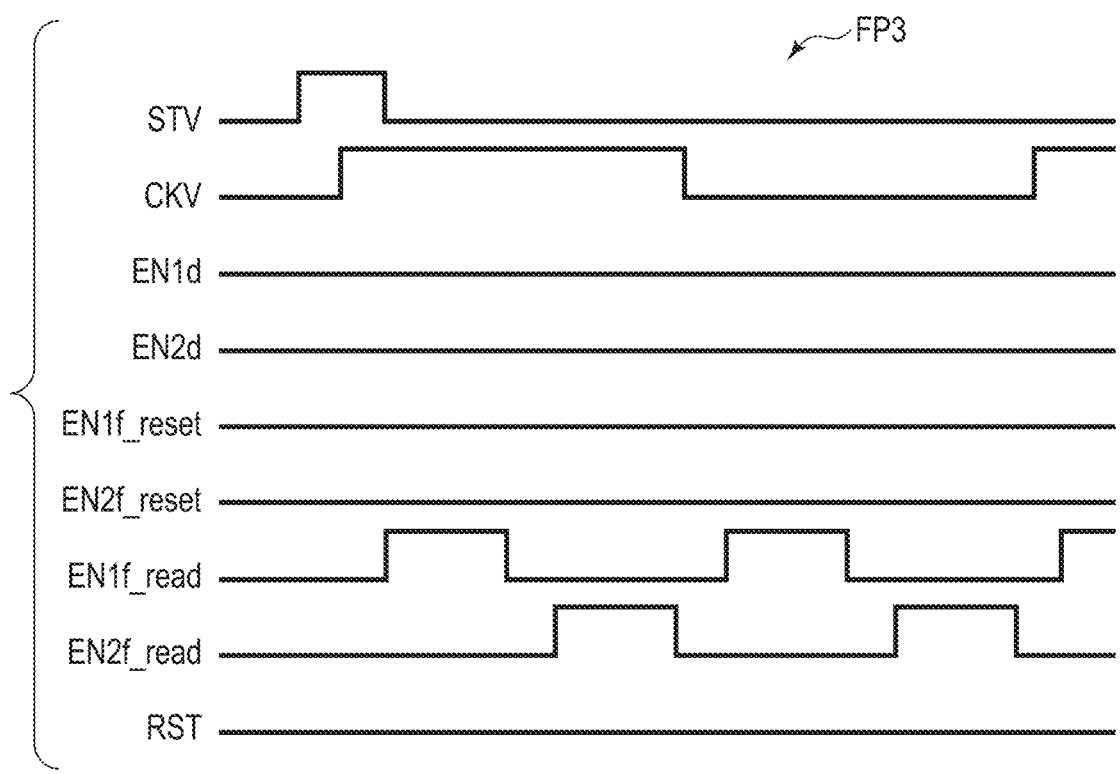
FIG. 14 is a timing chart showing operation examples of the scanning line/first scanning line drive circuit and the scanning line/second scanning line drive circuit in a read period shown in FIG. 11.

FIG. 14 is a timing chart showing operation examples of the scanning line/first scanning line drive circuit GD1 and the scanning line/second scanning line drive circuit GD2 during a display period DP during a read period FP3 included in the fingerprint imaging period FP.

When the read period FP3 included in the fingerprint imaging period FP is started and the start pulse signal STV is supplied to the shift register SR1A in the scanning line/first scanning line drive circuit GD1 and the shift register SR1B in the scanning line/second scanning line drive circuit GD2, the shift register SR1A outputs the low-level control signal SR_out1A, the high-level SR_out2A, and the high-level control signal SR_out3A to the gate switches GSW1A to GSW4A included in the corresponding gate switch group GSWG1A. In addition, the shift register SR1B outputs the high-level control signal SR_out1B, the low-level control signal SR_out2B, and the low-level control signal SR_out3B to the gate switch GSW2B included in the corresponding gate switch group GSWG1B, and outputs the low-level control signal SR_out1B, the high-level control signal SR_out2B, and the high-level control signal SR_out3B to the other gate switches GSW1B, GSW3B, and GSW4B. According to this, the switching elements SW11 and SW12 included in the gate switch GSWG2B are turned on.

In the gate switch group GSWG1B, the enable signal EN1$f$_read is supplied to the gate switch GSW2B in a period in which the potential of the clock signal CKV changes from high to low, after the gate switch GSW2B becomes the above-described state. When the enable signal EN1$f$_read is supplied to the gate switch GSW2B, the second scanning signal for sensor G_read1 is output from the gate switch GSW2B to the corresponding second scanning line SGL2 (in this case, the second scanning line SGL2 connected to the switching element SW2C included in the sensor circuit of the optical sensor OS located in the first row).

After the enable signal EN1$f$_read is supplied to the gate switch GSW2B, the shift register SR1B outputs the high-level control signal SR_out1B, the low-level control signal SR_out2B, and the low-level control signal SR_out3B to the gate switch GSW4B included in the corresponding gate switch group GSWG1B, and outputs the low-level control signal SR_out1B, the high-level control signal SR_out2B, and the high-level control signal SR_out3B to the other gate switches GSW1B to GSW3B. According to this, the switching elements SW11 and SW12 included in the gate switch GSWG4B are turned on.

In the gate switch group GSWG1B, the enable signal EN2$f$_read is supplied to the gate switch GSW4B in a period in which the potential of the clock signal CKV changes from high to low, after the gate switch GSW4B becomes the above-described state. When the enable signal EN2$f$_read is supplied to the gate switch GSW4B, the second scanning signal for sensor G_read2 is output from the gate switch GSW4B to the corresponding second scanning line SGL2 (in this case, the second scanning line SGL2 connected to the switching element SW2C included in the sensor circuit of the optical sensor OS located in the second row).

When the potential of the clock signal CKV changes from high to low, the start pulse signal STV is transferred from the shift register SR1A to the next shift register SR2A in the scanning line/first scanning line drive circuit GD1. Similarly, the start pulse signal STV is transferred from the shift register SR1B to the next shift register SR2B in the scanning line/second scanning line drive circuit GD2. The shift registers SR2A and SR2B, which receive the start pulse signals STV transferred from the shift registers SR1A and SR1B, respectively, and the gate switch groups GSWG2A and GSWG2B corresponding to the shift registers SR2A and SR2B, operate in the same manner as the shift registers SR1A and SR1B and the gate switch groups GSWG1A and GSWG1B corresponding to the shift registers SR1A and SR1B in a period in which the potential of the clock signal CKV changes from low to high. After that, the same operation is repeated in the last shift register SRmA and SRmB and the gate switch groups GSWGmA and GSWGmB corresponding to these shift registers SRmA and SRmB.

Incidentally, in the read period FP3, the enable signals EN1$d$, EN2$d$, EN1$f$_reset, and EN2$f$_reset are not supplied to the gate switches GSW1A to GSW4A included in each gate switch group GSWG in the scanning line/first scanning line drive circuit GD1, respectively (i.e., the scanning signal for display G_disp and the first scanning signal for sensor G_reset are not output from the scanning line/first scanning line drive circuit GD1 to the scanning line GL and the first scanning line SGL1). In addition, the enable signals EN1$d$ and EN2$d$ are not supplied to the gate switches GSW1B and GSW3B included in each gate switch group GSWG in the scanning line/second scanning line drive circuit GD2 (i.e., the scanning signal for display G_disp is not output from the scanning line/second scanning line drive circuit GD2 to the scanning line GL).

Advantages of the display device DSP according to the embodiment will be described below with reference to comparative examples. The comparative examples are intended to illustrate some of the effects that can be achieved by the display device DSP according to this embodiment, and the configuration and effects common to this embodiment and the comparative examples are not excluded from the scope of the present invention.

Figure 15:
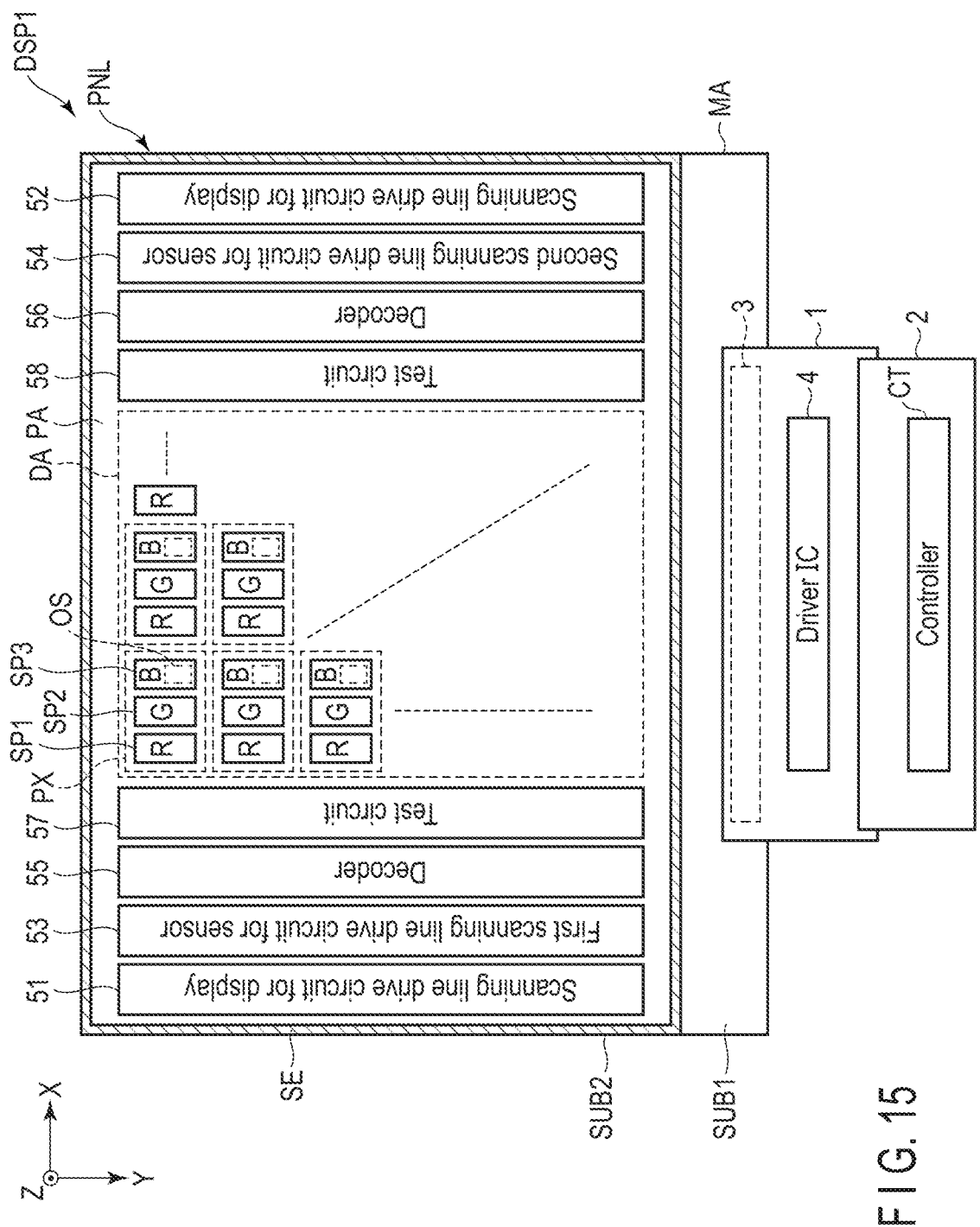
FIG. 15 is a plan view schematically showing a display device according to a first comparative example.

FIG. 15 is a plan view schematically showing a display device DSP1 according to a first comparative example. The display device DSP1 according to the first comparative example is different from the display device DSP of the present embodiment in that two scanning line drive circuits for display 51 and 52, a first scanning line drive circuit for sensor 53, a second scanning line drive circuit for sensor 54, two decoders 55 and 56, and two test circuits 57 and 58 are provided in left and right frame areas.

The scanning line drive circuits for display 51 and 52 are circuits that supply the scanning signals for display G_disp to the pixels TFT of pixels PX via the scanning lines GL. The first scanning line drive circuit for sensor 53 is a circuit that supplies the first scanning signal for sensor G_reset to the sensor circuit of the optical sensor OS located in each pixel PX via the first scanning line SGL1. The second scanning line drive circuit for sensor 54 is a circuit that supplies the second scanning signal for sensor G_read to the sensor circuit of the optical sensor OS located in each pixel PX via the second scanning line SGL2. The decoder 55 is, for example, a 5-bit decoder and is a circuit for decoding the control signal from the driver IC 4 and selecting the first scanning line SGL1 that outputs the first scanning signal for sensor G_reset. Similarly, the decoder 56 is, for example, a 5-bit decoder and is a circuit for decoding the control signal from the driver IC 4 and selecting the second scanning line SGL2 that outputs the second scanning signal for sensor G_read. The test circuits 57 and 58 are circuits for inspecting the short circuit system of various wires.

The configuration of the display device DSP1 according to the first comparative example has a problem that there are many elements to be arranged in the left and right frame areas and the left and right frame areas become as large as approximately 1.5 mm.

Figure 16:
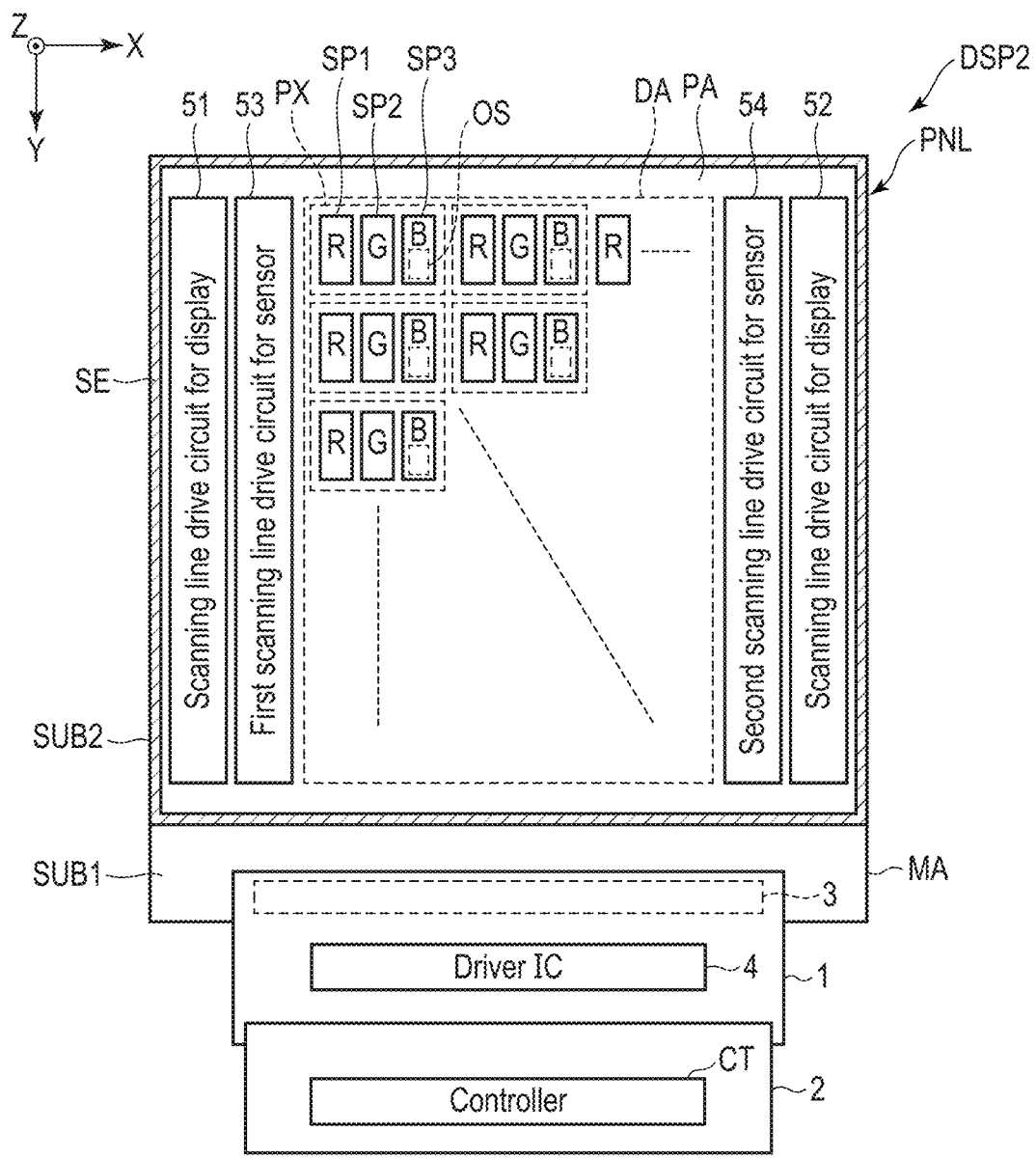
FIG. 16 is a plan view schematically showing a display device according to a second comparative example.

FIG. 16 is a plan view schematically showing a display device DSP2 according to a second comparative example. The display device DSP2 according to the second comparative example has a configuration in which the decoders 55 and 56 and the test circuits 57 and 58 are omitted in the display device DSP1 according to the first comparative example. Although detailed descriptions are omitted, shift registers are provided in the first scanning line drive circuit for sensor 53 and the second scanning line drive circuit for sensor 54, similarly to the scanning line drive circuits for display 51 and 52, as the decoders 55 and 56 are omitted.

In the configuration of the display device DSP2 according to the second comparative example, fewer elements are arranged in the left and right frame areas than in the display device DSP1 according to the first comparative example, and the left and right frame areas can be reduced to approximately 1.0 mm. However, since the left and right frame areas of recent smartphones and the like are approximately 0.7 mm to 0.8 mm wide, even the configuration of the display device DSP2 according to the second comparison example has the problem that the left and right frame areas are still large.

In contrast, the display device DSP of the present embodiment comprises the scanning line/first scanning line drive circuit GD1 that comprises both the functions of the scanning line drive circuit for display 51 and the first scanning line drive circuit 53 represented in the first and second comparative examples, and the scanning line/second scanning line drive circuit GD2 that has both the functions of the scanning line drive circuit for display 52 and the second scanning line drive circuit 54.

In realizing the scanning line/first scanning line drive circuit GD1, which comprises both the functions of the scanning line drive circuit for display 51 and the first scanning line drive circuit 53, the shift register SR for selecting the scanning line GL that outputs the scanning signal for display G_disp and the shift register SR for selecting the first scanning line SGL1 that outputs the first scanning signal for sensor G_reset are shared, and the gate switches GSW1A and GSW3A that supply the enable signals EN1$d$ and EN2$d$ for outputting the scanning signals for display G_disp and the gate switches GSW2A and GSW4A that supply the enable signals EN1$f\_$reset and EN2$f\_$reset for outputting the first scanning signals for sensor G_reset, are provided in the gate switch group GSWG corresponding to the shift registers SR.

Similarly, in realizing the scanning line/second scanning line drive circuit GD2, which comprises both the functions of the scanning line drive circuit for display 52 and the second scanning line drive circuit 54, the shift register SR for selecting the scanning line GL that outputs the scanning signal for display G_disp and the shift register SR for selecting the second scanning line SGL2 that outputs the second scanning signal for sensor G_read are shared, and the gate switches GSW1B and GSW3B that supply the enable signals EN1$d$ and EN2$d$ for outputting the scanning signals for display G_disp and the gate switches GSW2B and GSW4B that supply the enable signals EN1$f\_$read and EN2$f\_$read for outputting the second scanning signals for sensor G_read, are provided in the gate switch group GSWG corresponding to the shift registers SR.

According to this, since the scanning line/first scanning line drive circuit GD1 and the scanning line/second scanning line drive circuit GD2 can be configured, the elements arranged in the left and right frame areas can be further reduced as compared to the configuration of the second comparison example, and thus the left and right frame areas can be reduced to the extent of corresponding to smartphones and the like.

According to the above-described embodiment, the optical sensor-equipped display device capable of narrowing the frame area can be provided.

In the present embodiment, the display device DSP is the liquid crystal display device comprising the illumination device IL, but the display device DSP is not limited to this and may be an organic electroluminescent display device comprising an organic light emitting diode (OLED) as a display element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical sensor-equipped liquid crystal display device, comprising:
   a display panel comprising a first substrate, a second substrate opposed to the first substrate, and
   a liquid crystal layer located between the first substrate and the second substrate; and
   a driver IC, wherein
   the display panel comprises:
   a display area including a plurality of pixels arrayed in a matrix;
   a surrounding area surrounding the display area;

a first peripheral circuit and a second peripheral circuit connected to the driver IC and provided in areas located on left and right sides of the display area, of the surrounding area; and an optical sensor provided in at least one of the plurality of pixels, and comprising a photoelectric conversion element that outputs a detection signal in response to light made incident from the liquid crystal layer side, each of the first peripheral circuit and the second peripheral circuit comprises:

a shift register; and a gate switch group connected to the shift register and including a first gate switch and a second gate switch, each of the first gate switches is connected to a first switching element for driving the pixel via a scanning line, the second gate switch included in the first peripheral circuit is connected to a second switching element included in a sensor circuit for driving the optical sensor via a first scanning line for sensor, and the second gate switch included in the second peripheral circuit is connected to a third switching element included in a sensor circuit for driving the optical sensor via a second scanning line for sensor, wherein each of the first gate switches is turned on in a first period for displaying an image in the display area and supplies a scanning signal for display to the first switching element, the second gate switch included in the first peripheral circuit is turned on in a second period for resetting a potential of the optical sensor and supplies a first scanning signal for sensor to the second switching element, and the second gate switch included in the second peripheral circuit is turned on in the second period and a third period for reading the detection signal from the optical sensor and supplies a second scanning signal for sensor to the third switching element.

2. The optical sensor-equipped liquid crystal display device of claim 1, wherein each of the first gate switches and each of the second gate switches are controlled based on control signals output from the shift register.

3. The optical sensor-equipped liquid crystal display device of claim 1, wherein each of the first gate switches is connected to a wire for supplying a first control signal for outputting the scanning signal for display to the scanning line, the second gate switch included in the first peripheral circuit is connected to a wire for supplying a second control signal for outputting the first scanning signal for sensor to the first scanning line for sensor, the second gate switch included in the second peripheral circuit is connected to a wire for supplying a third control signal for outputting the second scanning signal for sensor to the second scanning line for sensor, and each of the first gate switches and each of the second gate switches are connected to wires for supplying low-potential voltages having potentials lower than the first control signal, the second control signal, and the third control signal, respectively.

* * * * *